(12) United States Patent
Burgess et al.

(10) Patent No.: US 10,409,592 B2
(45) Date of Patent: Sep. 10, 2019

(54) MULTIPLY-AND-ACCUMULATE-PRODUCTS INSTRUCTIONS

(71) Applicant: ARM LIMITED, Cambridge (GB)

(72) Inventors: Neil Burgess, Cardiff (GB); David Raymond Lutz, Austin, TX (US); Javier Diaz Bruguera, Austin, TX (US)

(73) Assignee: ARM Limited, Cambridge (GB)

( * ) Notice: Subject to any disclaimer, the term of this patent is extended or adjusted under 35 U.S.C. 154(b) by 60 days.

(21) Appl. No.: 15/494,946

(22) Filed: Apr. 24, 2017

(65) Prior Publication Data

US 2018/0307488 A1 Oct. 25, 2018

(51) Int. Cl.
*G06F 9/30* (2018.01)
*G06F 7/00* (2006.01)

(52) U.S. Cl.
CPC .............. *G06F 9/3001* (2013.01); *G06F 7/00* (2013.01); *G06F 9/30032* (2013.01); *G06F 9/30036* (2013.01)

(58) Field of Classification Search
CPC ..................................................... G06F 7/5443
USPC .................................................. 708/522, 523
See application file for complete search history.

(56) References Cited

U.S. PATENT DOCUMENTS

| 5,442,576 A  * | 8/1995 | Gergen ................... G06F 5/015 708/209 |
| 6,718,465 B1 | 4/2004 | Lin |
| 7,958,179 B2 | 6/2011 | Lyuh |
| 10,140,090 B2* | 11/2018 | Klein ...................... G06F 7/443 |
| 2002/0040379 A1 | 4/2002 | Amer |
| 2004/0210616 A1* | 10/2004 | Debes ................. G06F 9/30014 708/523 |
| 2004/0267855 A1* | 12/2004 | Shantz .................. G06F 7/5324 708/523 |
| 2005/0187998 A1* | 8/2005 | Zheng .................. G06F 7/5443 708/523 |

(Continued)

FOREIGN PATENT DOCUMENTS

WO  WO-9921078 A2 * 4/1999 ............. G06F 7/509

OTHER PUBLICATIONS

U.S. Appl. No. 15/859,931, filed Jan. 2, 2018, Inventor: Kennedy et al.

(Continued)

*Primary Examiner* — Andrew Caldwell
*Assistant Examiner* — Emily E Larocque
(74) *Attorney, Agent, or Firm* — Nixon & Vanderhye P.C.

(57) ABSTRACT

An apparatus has processing circuitry comprising an L×M multiplier array. An instruction decoder associated with the processing circuitry supports a multiply-and-accumulate-product (MAP) instruction for generating at least one result element corresponding to a sum of respective E×F products of E-bit and F-bit portions of J-bit and K-bit operands respectively, where $1<E<J\le L$ and $1<F<K\le M$. In response to the MAP instruction, the instruction decoder controls the processing circuitry to rearrange F-bit portions of the second K-bit operand to form a transformed K-bit operand, and to control the L×M multiplier array in dependence on the first J-bit operand and the transformed K-bit operand to add the respective E×F products using a subset of the adders used for accumulating partial products for a conventional multiplication.

20 Claims, 17 Drawing Sheets

(56) References Cited

U.S. PATENT DOCUMENTS

2007/0192399 A1\* 8/2007 Krithivasan ........ G06F 7/49994
 708/620
2011/0040815 A1 2/2011 Penton
2012/0233234 A1\* 9/2012 Brooks .............. G06F 7/49947
 708/521

OTHER PUBLICATIONS

Office Action dated Aug. 16, 2018 in co-pending U.S. Appl. No. 15/859,931, 12 pages.
Final Office Action dated Jan. 11, 2019 in U.S. Appl. No. 15/859,931, 12 pages.

\* cited by examiner

A　　0 0 1 0 1 1 1 0

SHL　　S = 4　　(× $2^4$)

0 0 (1) 0 (1) 1 1 0 0 0 0 0 non-sign bits shifted out → result > 01111111
→ saturate to max
　　　　0 1 1 1 1 1 1 1

$$R_{sat} = \begin{cases} \text{MAX IF } R \geq \text{MAX} \\ \text{MIN IF } R \leq \text{MIN} \\ R \text{ IF MIN} < R < \text{MAX} \end{cases}$$

SHR   S=3      ($\div 2^3 = \frac{78}{8} = 9.75$)

0 0 0 0 0 1 0 1 . 1 1 0    = 9 without rounding

R               0 . 1      +

0 0 0 0 0 1 1 0 . 0      = 10 rounded to nearest integer

SHR A, S [R] → $(A * 2^{SIZE-S})_{HI} + 0.1$ assert R at high order portion of multiplier array

FIG. 21

MULTIPLY-AND-ACCUMULATE-PRODUCTS INSTRUCTIONS

BACKGROUND

Technical Field

The present technique relates to the field of data processing.

Technical Background

Processing circuitry for performing data processing in response to instructions may include a multiplier for multiplying a pair of operands to generate a product result. The multiplier may comprise an array of adders for accumulating partial products of the pair of operands.

SUMMARY

At least some examples provide an apparatus comprising:
processing circuitry to perform data processing, the processing circuitry comprising an L×M multiplier array, where L and M are integers; and
an instruction decoder responsive to a multiply instruction specifying an L-bit operand and an M-bit operand to control the multiplier array to multiply the L-bit operand and the M-bit operand using a plurality of adders for accumulating partial products of the L-bit operand and the M-bit operand;
wherein in response to a multiply-and-accumulate-products (MAP) instruction specifying a first J-bit operand and a second K-bit operand, where J≤L and K≤M, the instruction decoder is configured to control the processing circuitry to generate a result value comprising at least one result element, each result element corresponding to a sum of respective E×F products of an E-bit portion of the first J-bit operand and an F-bit portion of the second K-bit operand, where 1<E<J and 1<F<K; and
in response to the MAP instruction, the instruction decoder is configured to control the processing circuitry to rearrange F-bit portions of the second K-bit operand to form a transformed K-bit operand, and to control the L×M multiplier array in dependence on the first J-bit operand and the transformed K-bit operand to add said respective E×F products using a subset of said plurality of adders.

At least some examples provide an apparatus comprising:
means for performing data processing, comprising means for performing L×M multiplication; and
means for decoding instructions, responsive to a multiply instruction specifying an L-bit operand and an M-bit operand to control the means for performing L×M multiplication to multiply the L-bit operand and the M-bit operand using a plurality of means for adding to accumulate partial products of the L-bit operand and the M-bit operand;
wherein in response to a multiply-and-accumulate-products (MAP) instruction specifying a first J-bit operand and a second K-bit operand, where J≤L and K≤M, the means for decoding instructions is configured to control the means for performing data processing to generate a result value comprising at least one result element, each result element corresponding to a sum of respective E×F products of an E-bit portion of the first J-bit operand and an F-bit portion of the second K-bit operand, where 1<E<J and 1<F<K; and
in response to the MAP instruction, the means for decoding instructions is configured to control the means for performing data processing to rearrange F-bit portions of the second K-bit operand to form a transformed K-bit operand, and to control the means for performing L×M multiplication in dependence on the first J-bit operand and the transformed K-bit operand to add said respective E×F products using a subset of said plurality of means for adding.

At least some examples provide a data processing method for an apparatus comprising an L×M multiplier array comprising a plurality of adders for accumulating partial products of an L-bit operand and an M-bit operand to be multiplied in response to a multiply instruction, where L and M are integers,
the method comprising:
in response to a multiply-and-accumulate-products (MAP) instruction specifying a first J-bit operand and a second K-bit operand, where J≤L and K≤M:
rearranging F-bit portions of the second K-bit operand to form a transformed K-bit operand, where 1<F<K; and
controlling the L×M multiplier array in dependence on the first J-bit operand and the transformed K-bit operand, to generate a result value comprising at least one result element, each result element corresponding to a sum of respective E×F products of an E-bit portion of the first J-bit operand and an F-bit portion of the second K-bit operand, where 1<E<J;
wherein the respective E×F products are added using a subset of said plurality of adders.

Further aspects, features and advantages of the present technique will be apparent from the following description of examples, which is to be read in conjunction with the accompanying drawings.

BRIEF DESCRIPTION OF THE DRAWINGS

FIG. 20 shows an example of a saturating shift operation;

FIG. 21 shows an example of a shift operation with rounding; and

DESCRIPTION OF EXAMPLES

Figure 1:
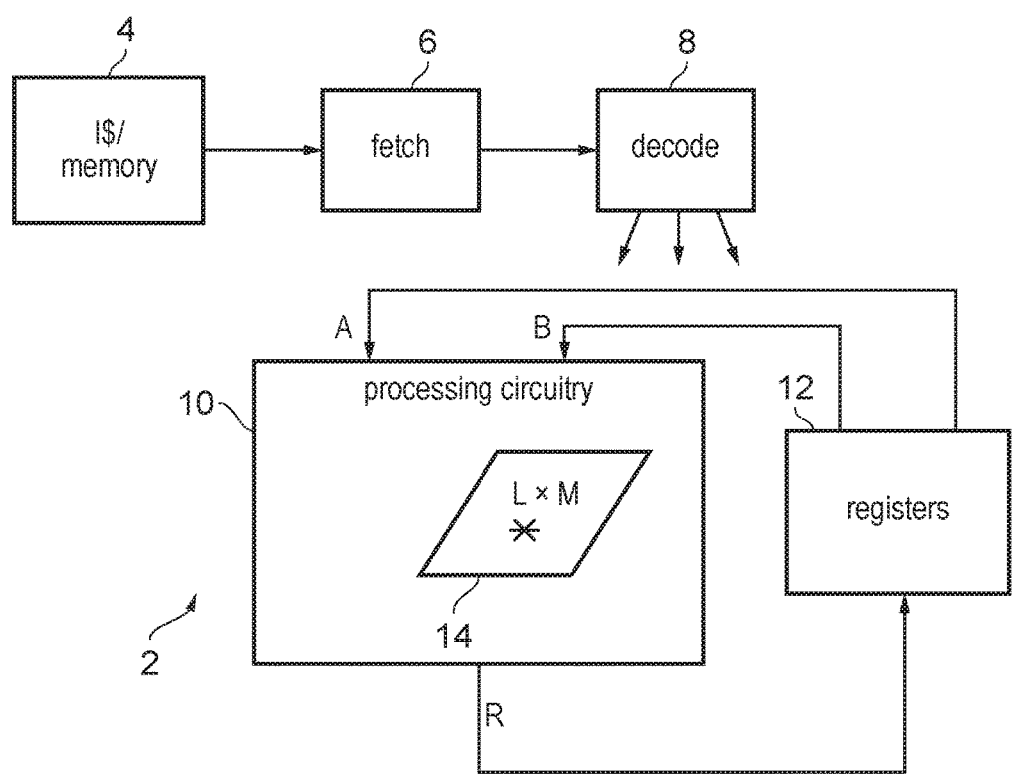
FIG. 1 schematically illustrates an example of a data processing apparatus having a multiplier array.

Specific examples are described below. It will be appreciated that the present technique is not limited to these particular examples.

Processing circuitry may include an L×M multiplier array for handling multiplications of L-bit and M-bit operands in response to a multiply instruction decoded by an instruction decoder. It will appreciated that the instruction decoder may also support multiply instructions operating on shorter operands with fewer than L and M bits respectively, by using only some parts of the multiplier, but nevertheless at least one multiply instruction acting on L- and M-bit operands is supported. L and M can be equal or unequal. The L×M multiplier array may include adders for accumulating partial products of the L- and M-bit operands.

Some processing applications may require the accumulation of a large number of products. This is particularly the case in digital signal processing (DSP) applications, where calculations such as Fast Fourier Transforms (FFT) or Discrete Cosine Transforms (DCTs) may typically involve the addition of many products. One approach for handling such accumulations of products can be to maintain an accumulator register and execute a multiply-accumulate instruction once per product to add the latest product of two operands to the previous accumulator value resulting from the sum of the previous products.

However, performance can be improved by calculating and adding more than one product per instruction. Hence, a multiply-and-accumulate-products (MAP) instruction may be provided which specifies a first J-bit operand and a second K-bit operand, where J≤L and K≤M. In response to the MAP instruction, the instruction decoder controls the processing circuitry to generate a result value comprising at least one result element where each result element corresponding to a sum of respective E×F products of an E-bit portion of the first J-bit operand and an F-bit portion of the second K-bit operand, where 1<E<J and 1<F<K (J and K can be equal or different, and E and F can be equal or different). However, while performance can be improved by calculating two or more E×F products per instruction, adding the respective E×F products together would normally be considered to require additional adders to be provided at the end of the multiplier array, in addition to the adders already provided for accumulating partial products in response to a multiply instruction. These extra adders typically incur a cost not only in terms of circuit area and power consumption, but also in terms of latency for the MAP operation.

In the technique described in this application, such additional adders can be avoided. The multiplier array used to handle regular multiplications can be reused for processing the MAP instruction, with the respective E×F products being added using a subset of the adders for accumulating partial products of L- and M-bit operands in response to a multiply instruction. By rearranging the order in which the F-bit portions of the second K-bit operand are presented to the multiplier array, the existing adders within the multiplier array can not only generate the E×F products but also accumulate multiple E×F products resulting from the same MAP instruction together, to avoid any need for additional adders beyond those already provided for handling standard multiply instructions. This saves circuit area and reduces the latency associated with the MAP instruction.

Operand rearrangement circuitry may be provided to rearrange the F-bit portions of the second K-bit operand from the transformed K-bit operand. For example, the operand rearrangement circuitry may comprise a set of multiplexers which select which portions of the second K-bit operand are mapped to each portion of the transformed K-bit operand. These multiplexers could for example be implemented on the operand path between the register file from which the operands are read and the multiplier array, or could be incorporated into read ports of the register file which may already have a set of multiplexers that select required data from registers.

For at least one segment of the second K-bit operand comprising at least two of the F-bit portions, the operand rearrangement circuitry may reverse an order of the F-bit portions within that segment of the second K-bit operand to form a corresponding segment of the transformed K-bit operand. For some variants of the MAP instruction, the segment may correspond to the entire second K-bit operand, so all the F-bit portions have their order reversed. Other variants may separately reorder multiple segments of the second K-bit operand independently, so that the transformation of the second operand retains each segment of F-bit portions in the same position collectively, but the order of the F-bit portions within each segment is reversed when mapping to the transformed K-bit operands (e.g. there is no swapping of F-bit portions between segments, but the order is reversed within a segment).

In general, by reversing the order of the F-bit portions within a given part of the second operand, this means that the adders of the multiplier array which have their results added together to form part of the multiplication result will correspond to partial product bits which result from multiplication of the correspondingly-positioned E-bit and F-bit portions of the original first and second operands, so that the existing adders within the multiplier array can be reused for accumulating the multiple E×F products being calculated in response to the MAP instruction. In contrast, if the multiplication had been performed on the original first and second operands then the products to be accumulated together would have been calculated in different columns of the multiplier array and so would have required a separate adder to add the E×F products after being output from the L×M multiplier array.

While in some embodiments the corresponding segment in the transformed K-bit operand may be the segment that has the same relative position within the operand as the associated segment of the second K-bit operand (and this is most efficient to implement in circuitry), this is not essential, and in some cases there may also be a reordering of the segments when mapping from the second K-bit operand to the transformed K-bit operand. If the segments are reordered, there may also be a corresponding reordering of segments of the first J-bit operand. Hence, a given segment of the second K-bit operand may be mapped to a corresponding segment of the transformed K-bit operand (with the elements within the segment reversed), which does not necessarily lie at the same relative position within the operand.

The operand rearrangement circuitry may support a number of different rearrangement patterns which may be selected in dependence on the parameter of the MAP instruction. For example, the different rearrangement patterns may correspond to different values of E and/or F and/or different segment sizes. The parameter of the MAP instruction used to select which rearrangement pattern to apply could be the instruction opcode which identifies the type of instruction (e.g. a number of different opcodes may be assigned to different forms of the MAP instruction). Alternatively, a number of different forms of MAP instruction may share the same opcode but have one or more other bitfields that directly or indirectly identify the rearrangement pattern to be used (e.g. by specifying values for E, F or the segment size, specifying an encoded value representing the particular rearrangement pattern, or specifying a register storing information for determining the rearrangement pattern).

Although rearranging elements of only one of the first and second operands is enough to allow the accumulation of the E×F products to be performed within the multiplier array (it can be more efficient in terms of timing or circuit area to rearrange only one of the operands), it is also possible to rearrange both the first and second operands. Hence, in some cases in response to the MAP instruction the instruction decoder may control the processing circuitry to rearrange E-bit portions of the first J-bit operand to form a transformed J-bit operand, and to control the L×M multiplier array in dependence on the transformed J-bit operand and the transformed K-bit operand to add the respective E×F products using the subset of adders. In this case, note that as the transformed J-bit operand is dependent on the first J-bit operand, the multiplier array is still controlled in dependence on the first J-bit operand and transformed K-bit operand as discussed above. The rearrangement of the first J-bit operand can be performed in a similar way to the second K-bit operand as discussed above. As both operands may be reordered, it is not essential for all segments within either the J-bit operand or the K-bit operand to have their elements reversed in order, since the reversal could be applied to one of the operands for one segment and to the other of the operands for the other segment.

The processing circuitry may include partial product forming circuitry to generate the partial products to be accumulated by the adders of the L×M multiply array. For a standard multiply instruction the partial product forming circuitry may for example form L 1*M-bit partial products or M 1*L-bit partial products to be accumulated. For example, the partial product forming circuitry may comprise a set of AND gates for generating an array of output bits which correspond to the product of the respective combinations of bits of the two input operands for the multiply instruction.

For the MAP instruction, the partial product forming circuitry may be reused, but to mask portions of the multiplier array which do not correspond to any of the E×F products to be added, a subset of partial product bits may be set to zero. This ensures that the output of the multiplier includes one or portions corresponding to the sum of respective E×F products. Which particular partial product bits are selected as the subset of partial product bits to be cleared to zero may depend on a parameter of the MAP instruction (e.g. the opcode or another bitfield), and may differ for different variants of the MAP instruction.

For at least one form of the MAP instruction, the instruction decoder may control the processing circuitry to generate the result value comprising a plurality of result elements, each result element specifying a sum of the respective E×F products of the E-bit portions within an X-bit segment of the first J-bit operand with the F-bit portions within a Y-bit segment of the second K-bit operand, where $E<X<J$ and $F<Y<K$. Hence, a number of independent accumulations of sub-products within different segments may be performed within the multiplier array in parallel in response to the same MAP instruction, to generate separate result elements within the result value corresponding to the sums of the different segments of sub-products. For example, the instruction decoder may control the L×M multiplier array to add the respective E×F products for a first X-bit segment of the first J-bit operand and a first Y-bit segment of the second K-bit operand using a first subset of said plurality of adders, and to add the respective E×F products for a second X-bit segment of the first J-bit operand and a second Y-bit segment of the second K-bit operand using a second subset of said plurality of adders.

Note that in the addition of the respective E×F products using the adders of the multiplier array, it is not necessary for each of those E×F products to be separately calculated before being added together. Multiple E×F products may be added together in a series of additions of 1*E or 1*F partial products, so for the second E×F product or further E×F products for example, each 1*E or 1*F partial product of that E×F product may be added to the accumulation total of all the previous partial products, so that the actual value of the second or further E×F product is never determined. Hence, the determination of the result may use any series of additions which generates a result value corresponding to the sum of the E×F products of respective E-bit and F-bit portions of the first and second operands respectively, regardless of the exact sequence of additions used to generate that result.

An advantage of the technique discussed above is that it does not require special multiplier circuitry. In some examples, the adaptation for handling the MAP instruction may be provided by manipulating the input operands to the L×M multiply array, and so an existing multiply array can be reused. There are a number of techniques for accelerating the multiplication of L- and M-bit operands in an L×M multiplier array, and so any such technique can be used alongside the MAP instruction processing technique described above. For example, the L×M multiplier array may comprise a Wallace tree multiplier. Other known acceleration techniques may include 4:2 compression which can also be used.

Another technique for speeding up multiplications can be to encode one of the operands being multiplied using Booth encoding, in which a binary number is converted to a radix-4 number with a digit set {−2, −1, 0, +1, +2}. While Booth coding can add some complexity to the generation of a partial product, it can reduce the total number of partial products which have to be added and so this can speed up the multiplier array. For a standard multiply instruction, Booth encoding circuitry may be provided to encode one of the operands to be multiplied using Booth encoding (it does not matter which of the operands is transformed using the Booth encoding). However, while in principle either of the first J-bit operand and the second K-bit operand could be Booth encoded in response to the MAP instruction, re-encoding the second K-bit operand would require an additional step to be performed before or after the rearrangement of the F-bit portions. To speed up processing, the Booth encoding circuitry may encode the first J-bit operand using Booth encoding in parallel with the operand rearrangement circuitry rearranging the F-bit portions of the second K-bit operand to form the transformed K-bit operand.

If Booth encoding is used for signed multiplications then the MAP instruction handling technique discussed above can be used with any existing L×M Booth multiplier array. However, if unsigned multiplications are to be supported, then the Booth encoding may introduce an additional digit into the value being encoded. Hence, if multiple sub-products are being calculated in response to the MAP instruction with unsigned arithmetic, each E-bit or F-bit portion to be used to form the E×F products may produce an extra digit, hence requiring an additional partial product to be accumulated for each of the E×F products being added to form one result element in response to the MAP instruction.

Hence, the plurality of adders of the L×M multiplier array may comprise a number of adders sufficient to add at least N Z-bit partial products, where N is one of L and M and Z is the other of L and M, and the processing circuitry may comprise additional partial product adding circuitry to add an additional $P_{max}$ partial products, where P is the number of respective E×F products to be added to form one result element of the result value, and $P_{max}$ is a maximum value for P supported by the processing circuitry. In response to the MAP instruction, the instruction decoder may control the processing circuitry to generate a result corresponding to a sum of said N Z-bit partial products and at least one of said further $P_{max}$ partial products. In response to a multiply instruction, the instruction decoder may control the processing circuitry to generate a result dependent on the sum of the N Z-bit partial products, independent of any further $P_{max}$ partial products added by the additional partial product adding circuitry (either by zeroing inputs to the additional partial product adding circuitry, or by bypassing the additional partial product adding circuitry completely). This enables Booth encoding to be used for the MAP instruction.

There are a number of ways in which the additional partial product adding circuitry can be implemented. In some examples, the additional partial product adding circuitry may comprise further adders included in the L×M multiplier array such that the plurality of adders comprises a number of adders sufficient to add at least (N+$P_{max}$) Z-bit partial products. Hence, the additional partial product adding circuitry may simply be some additional rows of adders within the existing L×M multiplier array. For multiply instructions, the inputs to these further adders can be set to zero to ensure the multiplier only adds N Z-bit partial products to form the result of the multiply instruction. For a MAP instruction, at least one of the rows of further adders may be supplied with values selected based on the input operands (the number of additional partial products to be added may depend on how many E×F products are being added to form one result element of the result value, as P may be less than or equal to $P_{max}$ for a given instance of a MAP instruction, so a given MAP instruction may not require all of the further adders).

Alternatively, the additional partial product adding circuitry may be separate from the L×M multiplier array and may add the additional $P_{max}$ partial products to form a single value. By adding the P additional partial products arising from the Booth encoding using a separate logic circuit "to the side" of the existing L×M multiplier, this may be less disruptive to the existing multiplier, as only one additional value then needs to be added to the result of the L×M multiplier array (either within the array using an extra row of adders, or in a separate adder). This can allow the MAP instruction to be implemented with less disruption to existing L×M multiplier designs, which can make circuit development less expensive and reduces the impact on multiply instructions.

Other examples can provide a hybrid of the two approaches discussed above. Hence, the additional partial product adding circuitry may comprise: adding circuitry separate from said L×M multiplier array to reduce said further $P_{max}$ partial products to R further partial products, where 2≤R<$P_{max}$; and further adders included in said L×M multiplier array, such that said plurality of adders comprises a number of adders sufficient to add at least (N+R) Z-bit partial products. Hence, some additional adders may still be included in the L×M multiplier array, but only sufficient to add R further partial products, where R is less than $P_{max}$, and when more than R additional partial products are required then separate adding circuitry is used to reduce up to $P_{max}$ additional partial products to R additional partial products which can then be added by the further adders of the L×M multiplier array. This approach can be more efficient than the approach where all the $P_{max}$ additional partial products are added within the L×M multiplier array, as the separate adding circuitry may use techniques such as a 4-to-2 addition which can be faster than adding 4 numbers to produce a single result. This approach trades speed against disruption of the L×M multiplier array.

L and M can be regarded as the maximum size supported by the multiplier array for the first and second operands respectively. It is possible to implement the technique discussed above on an L×M multiplier array where L does not equal M. However, in practice many existing multiplier arrays assume operands of the same maximum size, with L=M. The term "L×M multiplier array" is not intended to limit whether the multiplication is performed with the addition of L 1*M-bit partial products or with the addition of M 1*L-bit partial products (so an L×M multiplier could equally be referred to as an M×L multiplier array).

J and K refer to the sizes of the first and second operands of the MAP instruction, which may be equal to L and M respectively or could be smaller. J may be equal to K. However, it is also possible to provide a MAP instruction acting on different sized operands, so that J and K are different. For example, not all of the portions of the larger operand may be used for forming E×F products with the portions of the smaller operand. Alternatively, a number of parallel computations of result elements may be calculated, with each result element using the same set of E-bit or F-bit portions from the smaller of the first and second operands, but using different sets of E-bit or F-bit portions from the larger of the first and second operands, as the portions to be multiplied to form the E×F products being accumulated.

X and Y refer to the size of the segments within which E×F products of corresponding portions are added together, for the first J-bit operand and second K-bit operand respectively. X may equal Y, or X and Y may be different. Again, X may equal J or be smaller than J, and Y may equal K or be smaller than K. It is not essential for the ratio J/X to be equal to the ratio K/Y.

E and F refer to the size of the individual portions multiplied to form each E×F product. E and F can be equal or different. In cases where E and F are different, additional partial product bits can be zeroed by the partial product forming circuitry at the input to the L×M multiplier array, to pad out the shorter portion size to match the longer portion size.

FIG. 1 schematically illustrates an example of a portion of a data processing apparatus 2. It will be appreciated that FIG. 1 is a simplified representation and omits many components which would typically be present in a data processor. As shown in FIG. 1 the processing apparatus 2 includes an instruction cache or memory 4 for storing program instructions to be executed, a fetch stage 6 for fetching the instructions from the instruction cache or memory 4. The fetch stage 6 may for example include branch prediction functionality for predicting the outcomes of branch instructions in order to determine the likely course of program flow in the program being executed and fetch corresponding sequences of instructions for decoding and processing. A decode stage 8 decodes the fetched instructions to generate control signals for controlling processing circuitry 10 to perform data processing operations corresponding to those instructions.

In general the processing circuitry 10 may read operand values A, B from registers 12 and generate processing results R to be written back to the registers 12. The processing circuitry 10 may include a number of execution units for performing different kinds of processing operations. For example the execution units can include load/store units for handling memory accesses to a memory, arithmetic/logical execution units for handling integer arithmetic or logical operations and floating point units for handling floating-point operations. As shown in FIG. 1, at least one execution unit of the processing circuit may include an L×M multiplier array 14 for calculating results of multiplications performed on L-bit and M-bit operands. While FIG. 1 shows a single multiplier array 14, some processors may have several multiplier arrays which may support the size operand sizes L, M or could support different operand sizes. For example, in a vector processor, there may be multiple multiplier arrays for handling multiplications performed on respective lanes of a vector operand. Alternatively, the vector instructions could be processed with each lane handled sequentially on a single multiplier. Hence, it will be appreciated that FIG. 1 is just an example and there are many variants of how a multiplier can be implemented for particular kinds of instruction.

Figure 2:
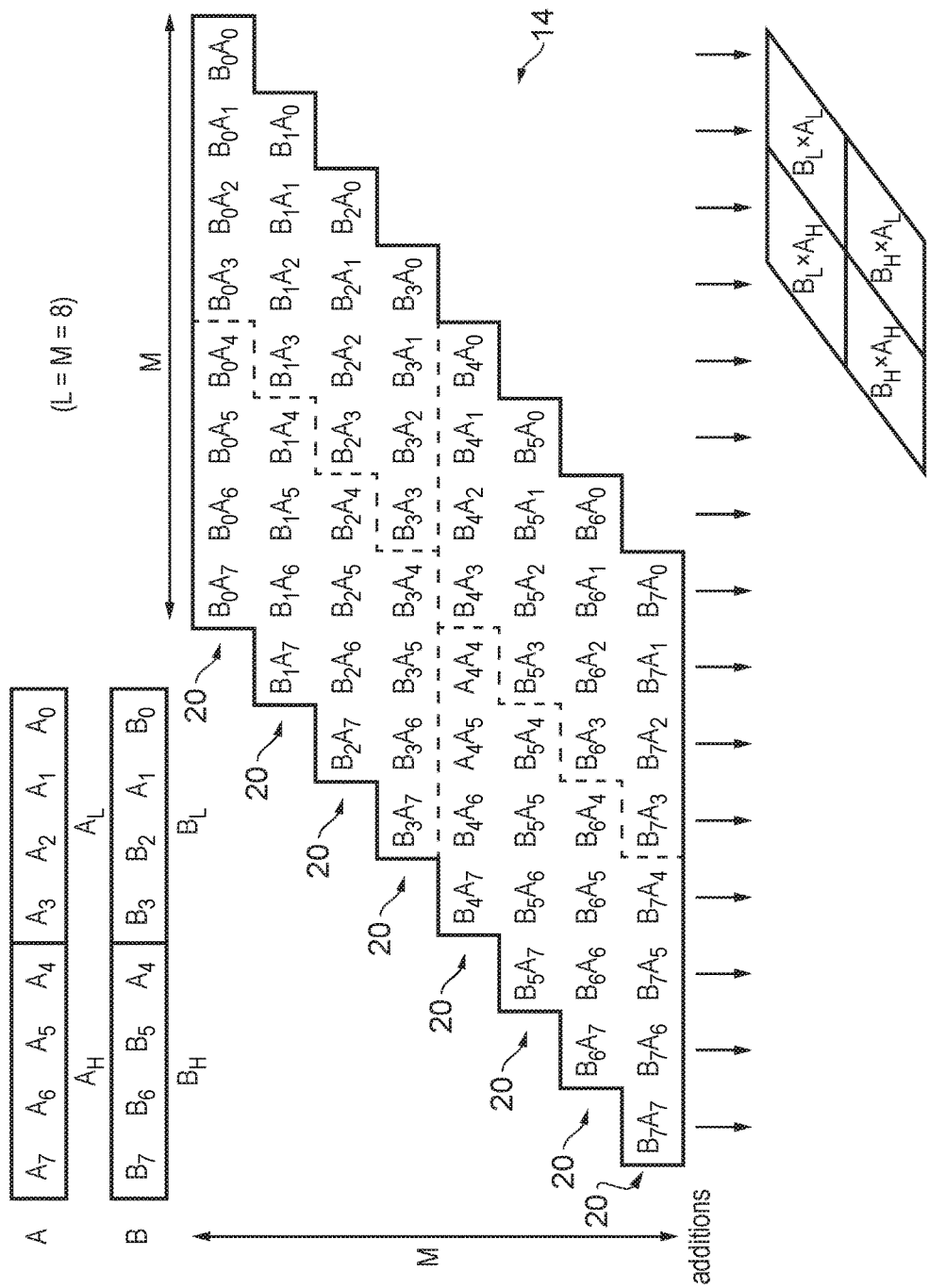
FIG. 2 shows an example of the addition of partial products by adders of an L×M multiplier array, where for this example L=M=8.

FIG. 2 shows an example of L×M multiplication in a case where L=M=8. As shown in FIG. 2, the multiplication can be viewed as a sum of L 1*M-bit (or M 1*L-bit) partial products 20 with each partial product corresponding to the product of a single bit of one of the operands B multiplied with the other operand A. The partial products are aligned based on their relative bit significance, and columns of adders add the correspondingly positioned bits in each column to form the multiplication result. This is similar to the way in which a long multiplication would be calculated by hand.

Figure 3:
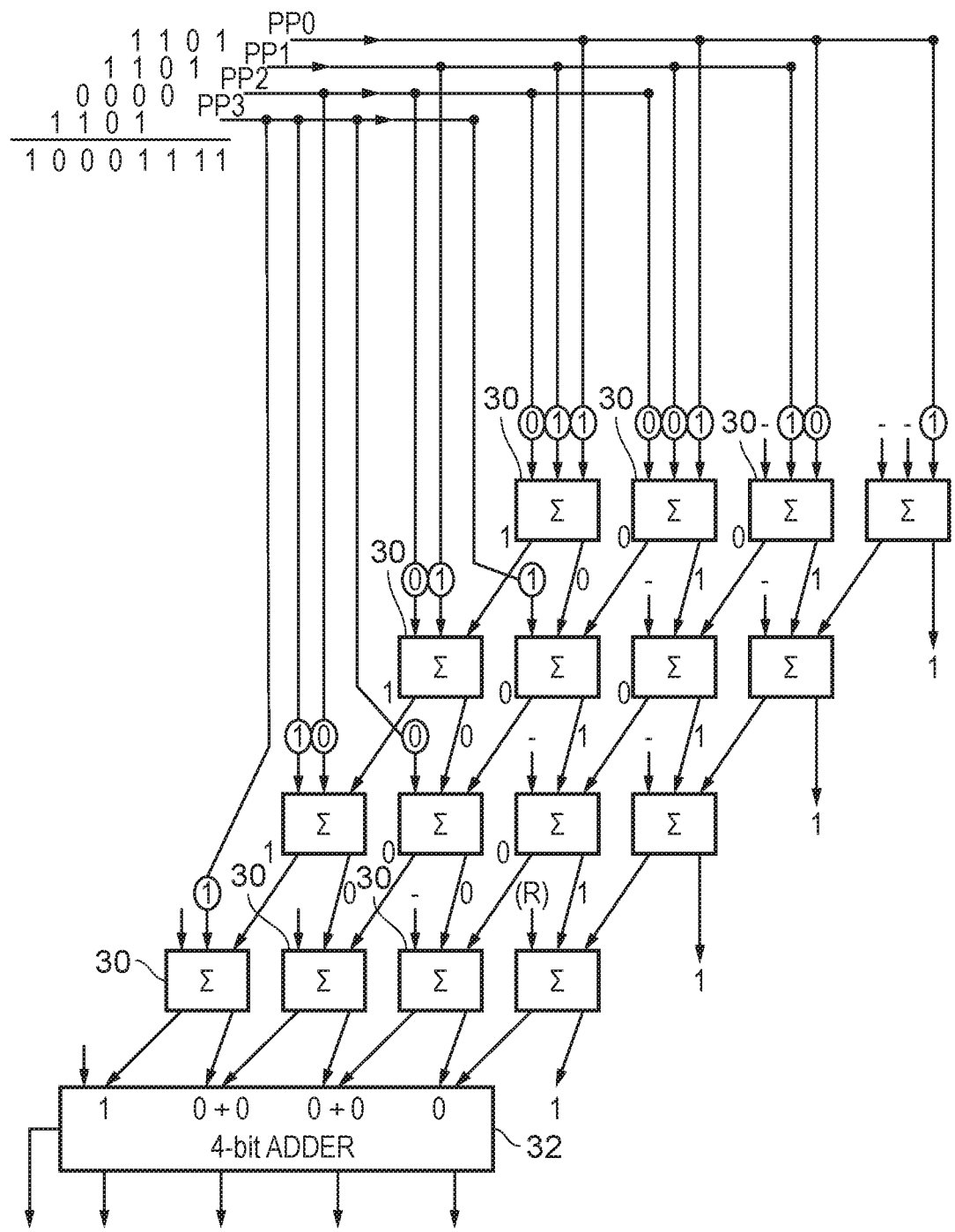
FIG. 3 shows an example of adders for a 4×4 multiplier array.

FIG. 3 shows an example of an array of adders 30 which can be provided within the multiplier array 14 for accumulating the various partial products. For conciseness, the example of FIG. 3 shown with L=M=4. In this example, the multiplier array 14 comprises 4 rows of carry-save adders 30 which are supplied with partial product bits calculated based on the input operands A and B. For example, FIG. 3 shows an example of calculating 13 times 11 in decimal, i.e. 1101×1011 in binary:

|   |   |   | 1 | 1 | 0 | 1 |   |
|---|---|---|---|---|---|---|---|
|   |   | 1 | 1 | 0 | 1 |   |   |
|   | 0 | 0 | 0 | 0 |   |   |   |
| 1 | 1 | 0 | 1 |   |   |   | + |
| 1 | 0 | 0 | 0 | 1 | 1 | 1 | 1 |

FIG. 3 shows how the partial products of the sum shown above map to the inputs of the array of adders. The carry save adders produce a 4-bit result in carry-save form (i.e. carries generated in the final row of adders 30 have not yet been added to the addition results of the final row of adders), and so a 4-bit carry-propagate adder 32 is provided to add the sums and carries to produce a 4-bit result in binary form. Note that the actual product result of multiplying two 4-bit values has 8 bits. The result of the carry-propagate adder 32 represents the upper 4 bits, and the lower 4 bits are output directly by the right hand carry-save adder in each row. Some variants of a multiply instruction may return the lower half of the full product instead of the upper half. Either way, it can be seen from the example of FIG. 3 that the 8 bits of the full product correspond to the same bit values shown for the multiplication worked out above.

For some applications, when the upper half of the full product is selected, it may be desirable to round the upper half of the product based on the lower bits. To support this, a rounding constant (R) can be input at the rightmost carry-save adder in the last row, to add 1 to the sum of the partial products at the bits position one place below the least significant bit of the upper half of the product. Hence, if the bit one place below the cut off for the upper half of the product is 1, then adding a further 1 will cause a 1 to be carried over into the least significant bit of the selected half of the product, effectively rounding the result to the nearest value representable using the upper bits. Some rounding modes may prescribe conditions for determining whether a product result exactly half way between two values representable using the upper bits should be rounded up or down. For such rounding modes, the decision on whether to set (R) to 0 or 1 may depend on the values of the lower bits of the full product which are not selected for output.

FIG. 3 is just one example of a possible multiplier design. There are many known techniques for enabling multiplications to be performed faster than is shown in the simple example of FIG. 3, such as using a Wallace tree, Booth encoding or 4:2 compression. The example of FIG. 3 can be expanded to a larger size to support an L×M multiplier array of arbitrary size, but it will be appreciated that this is not the only technique that could be used, and other combinations of adders could be used for accumulating the various partial products of the multiplication.

Figure 4:
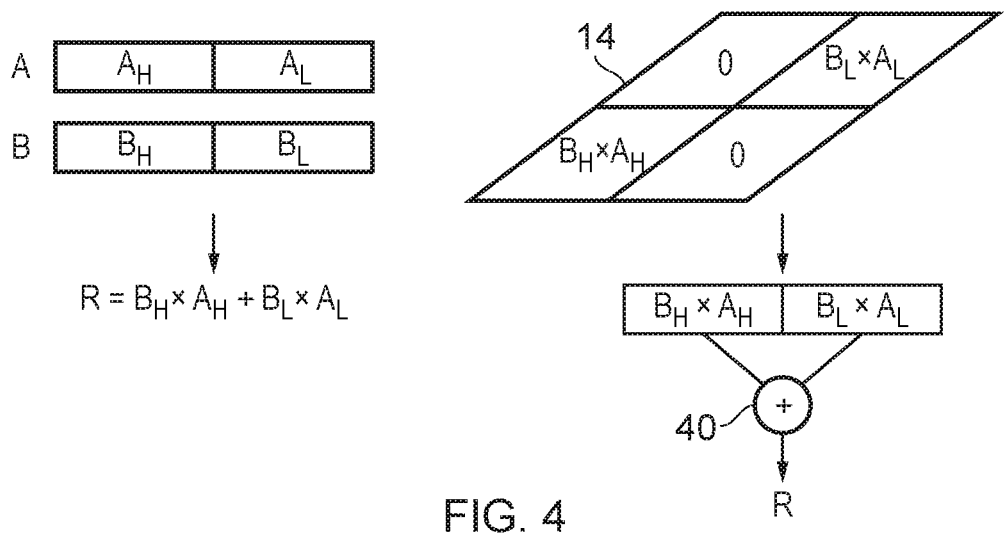
FIG. 4 illustrates, for comparison, an example of accumulating respective products of sub-portions of the operands if the operands are input to the multiplier array in their original form.

As shown in FIG. 4, some processor architectures may support a MAP instruction which returns the sum of respective pairs of products of sub-portions within a larger operand. For example, as shown in FIG. 4, the result of a vector multiply-and accumulate-products instruction may be to multiply the high portions of the input operands A and B, multiply the low portions of the two input operands, and add the two product results. This type of operation can be very useful for DSP applications for example. Other variants of such sub-vector multiply-and-add instructions operating on the 32-bit operand could return results as follows:

(A[31:24]×B[31:24])+(A[23:16])×B[23:16])+(A[15:8]× B[15:8])+(A[7:0])×B[7:0])

(A[31:24]×B[23:16])+(A[23:16]×B[31:24]) in parallel with (A[15:8]×B[7:0])+(A[7:0]×B[15:8])

The addends for the accumulation for such a MAP instruction may be the lower half of the product resulting from each sub-multiplication (the upper half of the full product of each sub-multiplication can be ignored). Note that the MAP instruction does not require all of the sub products to be added together. For example in the second of the two examples shown above the second option provides for each pair of adjacent sub-products to be added together but the first and second sub-products are not added to the third and fourth products.

As shown by the dotted lines in FIG. 2, the L×M multiplier array can be conceptually split into portions which map to the product of certain subportions of the input operands. For example, if the portions are the respective halves of the operands A and B, then the multiplier can be divided conceptually into quadrants as shown at the bottom of FIG. 2. The top-right quadrant multiplies the lower halves $B_L$, $A_L$ of the two operands. The top-left quadrant multiplies the upper half $A_H$ of operand A with the lower half $B_L$ of operand B. The bottom-right quadrant multiplies the lower half $A_L$ of operand A with the upper half $B_H$ of operand B. The bottom-left quadrant multiplies the top halves $A_H$, $B_H$ of the two operands A and B. Note that the positions of the respective quadrants in the multiplication array mean that the top-left and bottom-right quadrants have their results added together by the columns of adders within the multiplier array 14, but the bottom-left and top-right quadrants are in separate columns of adders and so are not added.

Hence, for implementing a MAP instruction with operands A and B input to the multiplier in their original form, it is possible to calculate the products of the upper and lower halves of the operands A and B respectively within the multiplier array as shown in the right hand part of FIG. 4, but this would require a further adder 40 provided beyond the output of the multiplier array 14 in order to add the respective sub products together. This additional adder 40 adds extra circuit area and power consumption and also adds extra latency to the operation. This issue can be addressed by reordering one of the input operands so that the accumulations of the respective sub products can take place within the existing multiplier array 14, eliminating the need for subsequent adding circuitry 40.

Figure 5:
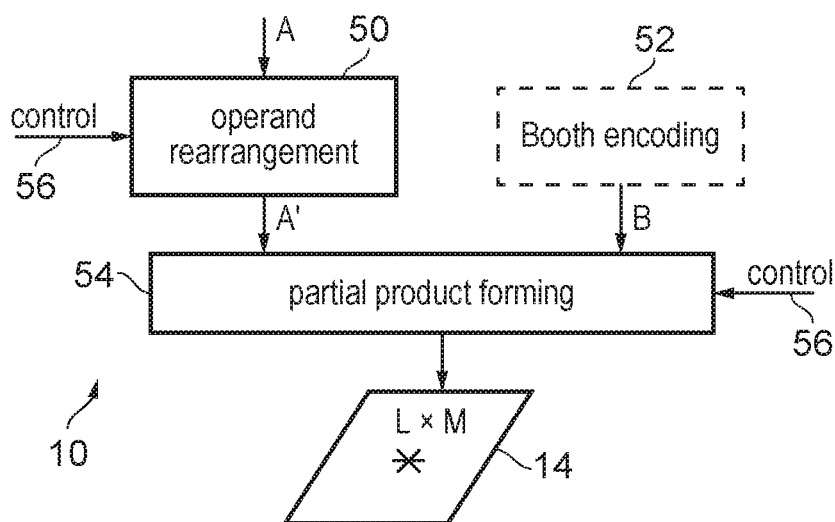
FIG. 5 shows an example of a portion of the processing circuitry for handling multiply-and-accumulate-products (MAP) instructions.

FIG. 5 shows an example of a portion of the processing circuitry 10 comprising the L×M multiplier array 14. Prior to the input of the L×M multiplier 14, operand rearrangement circuitry 50 is provided for reordering F-bit portions of operand A for the MAP instruction to form a transformed operand A'. Optionally, Booth encoding circuitry 52 may be provided for Booth encoding the other operand B in parallel with the operand rearrangement being performed by the operand rearrangement circuitry 50. However, some implementations may not use Booth encoding and in this case circuitry 52 can be omitted. If Booth encoding is used, then to support unsigned multiplications additional rows of carry save adders 30 can be included in the multiplier to handle additional digits introduced by the Booth encoding.

The first operand B (comprising J bits) and transformed operand A' (comprising K bits) are both provided to partial product forming circuitry 54 which calculates a number of partial product bits which are supplied to the respective adders 30 of the L×M multiplier 40. The partial product forming circuitry 54 selects certain bits which are cleared to 0 depending on the particular variant of the MAP instruction being executed. Hence, both the operand rearrangement circuitry 50 and the partial product forming circuitry 54 are dependent on at least one control parameter 56 which is determined in dependence on the encoding of the MAP instruction by the instruction decoder 8 or accessed from a register referenced by the MAP instruction.

Figure 6:
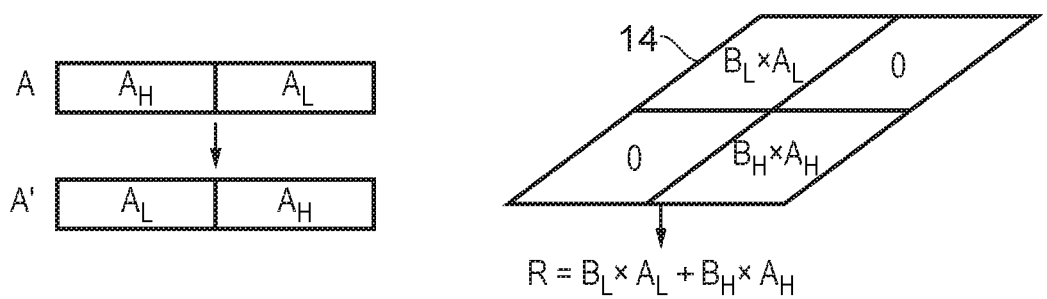
FIG. 6 shows an example of rearranging one of the operands so that the respective products of sub-portions of the operands can be added using a subset of the same adders used for accumulating partial products in response to a multiply instruction.

FIG. 6 shows an example of the general principle of handling a MAP instruction using the existing multiplier. In this example, X=Y=J=K and E=F=M/2. Hence, in this case the reordering applied by the operand rearrangement circuitry 50 swaps the order of the upper and lower halves of the second operand A to generate the transformed operand A'. As shown in the right hand side of FIG. 6, this means that when the operands are provided to the multiplier array 14, the portions of the multiplier array multiplying the top halves of the two operands and the bottom halves of the two operands are in the top left and bottom right quadrants of the multiplier respectively. Inputs to the bottom left and top right quadrants can be set to zero by the partial product forming circuitry 54. This means that when the various columns of adders calculate their sums in a similar way to discussed above for FIGS. 2 and 3, then the output of the adders within the portion corresponding to the top left and bottom right quadrants of the multiplier will generate a result which corresponds to the total of a first E×F product corresponding to the upper halves of operands A and B and a second E×F product corresponding to the lower halves. Hence, the accumulation of the respective sub products has been calculated within the L×M multiplier itself rather than requiring a further adding stage.

Figure 7A:
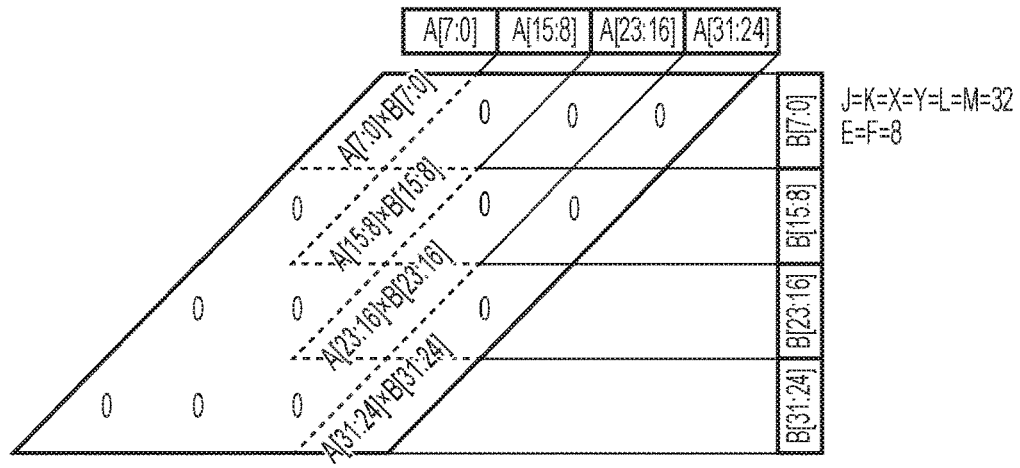
FIGS. 7A to 7C show examples of configuring the multiplier array to handle three different variants of a MAP instruction.
Figure 7B:
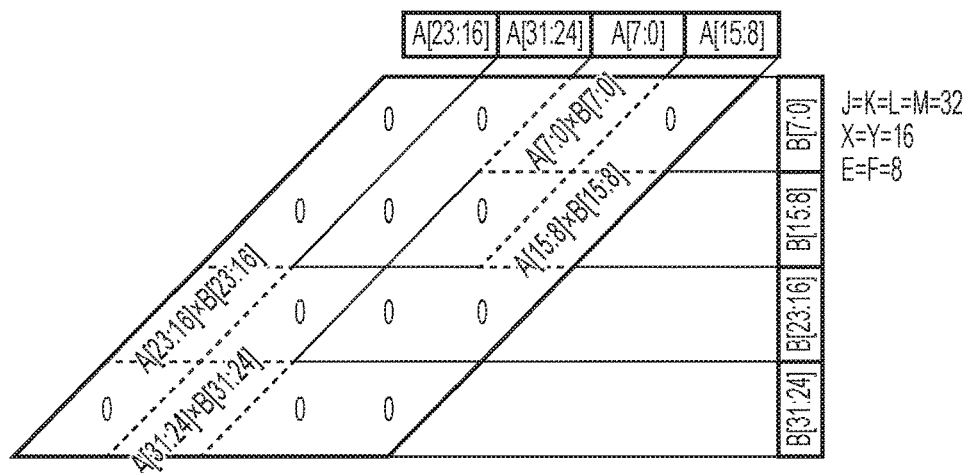
Figure 7C:
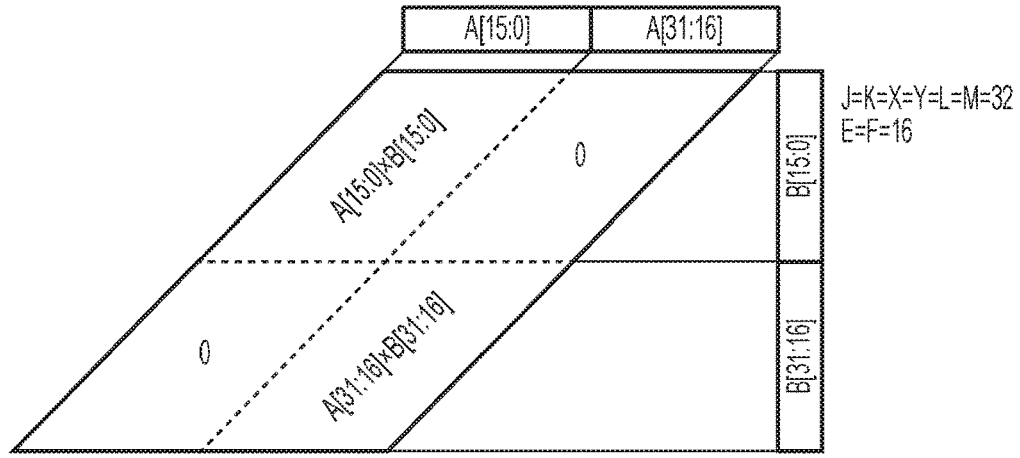

FIGS. 7A to 7C show three more examples of handling variants of a MAP instruction. In FIG. 7A four 8×8 products are calculated and added using a 32×32 multiplier array, by reversing the order in which the respective 8-bit portions of one of the input operands A are presented to the multiplier. In FIG. 7B, two pairs of 8×8 products are added together, but the respective pairs are not added, to form two independent result elements each corresponding to a sum of two 8×8 products. In this case, the 8-bit portions within each half of operand A are swapped but they remain within the same half of the operand when transforming A into A'. in this case N is less than M. In FIG. 7C, the MAP instruction is similar to the example of FIG. 6 and this example adds two 16×16 products within a 32×32 multiplier array. As shown in FIGS. 7A to 7C, unused portions of the multiplier array are zeroed by setting the corresponding partial product bits to 0 at the input of the multiplier.

Figure 7D:
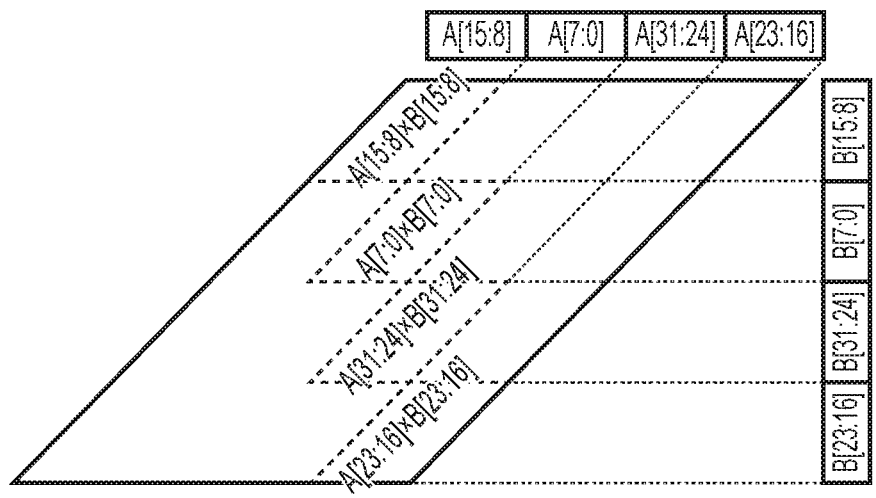
FIG. 7D shows an example of a processing a MAP instruction with rearrangement of elements of both operands.

The examples above show cases where only one of the operands A is rearranged. However, as shown in FIG. 7D, it is also possible to implement the MAP instruction with a rearrangement to both operands. For example, in FIG. 7D the reversal of elements is applied to operand B, but also there is a swapping of the upper and lower halves of both operands A, B, giving the same result as in FIG. 7A. Hence, it is not essential to provide rearrangement of only one of the operands.

Figure 8:
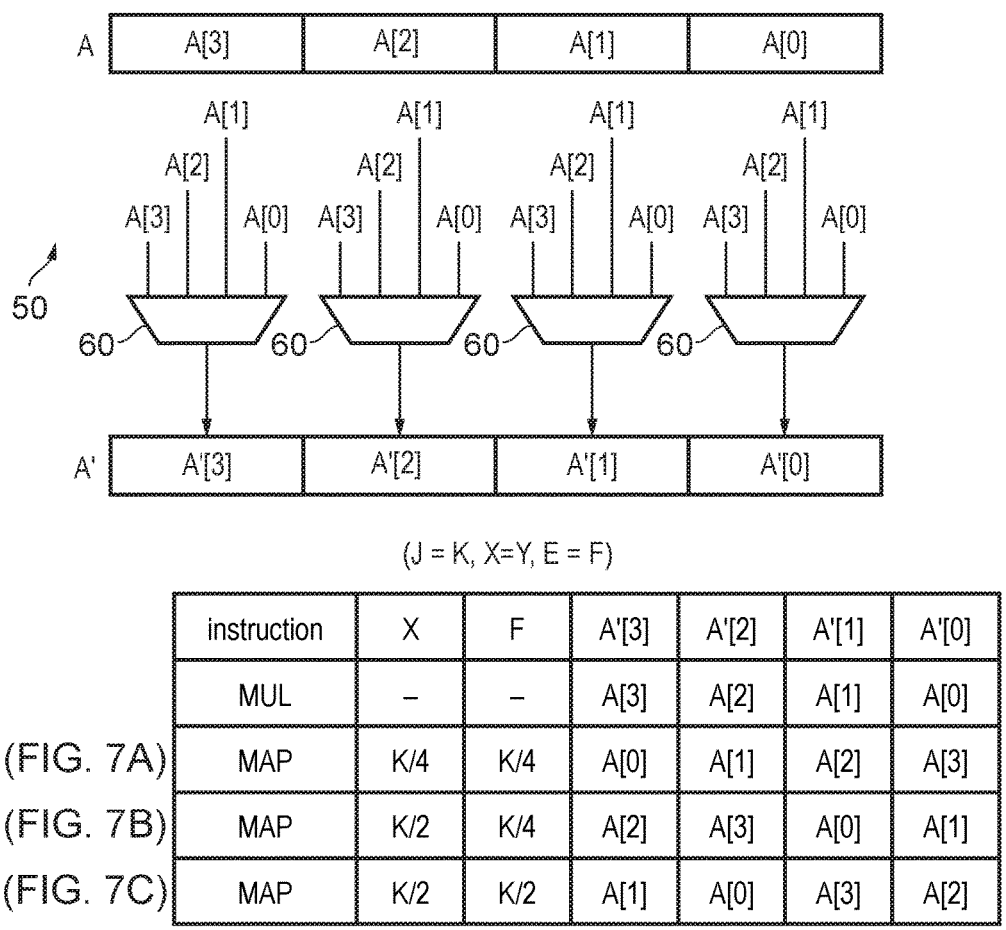
FIG. 8 shows an example of operand rearrangement circuitry for rearranging portions of the second operand.

FIG. 8 shows an example of the operand rearrangement circuitry 50 for supporting the examples of FIGS. 7A-7C. The operand rearrangement circuitry 50 may include a set of multiplexers 60 for selecting which portion of the second operand A is mapped to each of the portions of the transformed operand A'. Each multiplexer 60 may for example correspond to a certain fixed size portion of the second operand A, such as 4 bits, 8 bits or 16 bits. Although FIG. 8 shows an example with four multiplexers 60, clearly this can be scaled to smaller or larger sizes as desired. The table at the bottom of FIG. 8 shows an example of how to control which portions of the input operand A are mapped to each portion of the transformed operand A' for a standard multiply instruction and the three variants of the MAP instruction shown in FIGS. 7A to 7C respectively. For the MAP instructions the corresponding values of Y and F are also shown (in these examples, J=K, X=Y, E=F). In examples such as FIG. 7D where both operands are rearranged a second set of multiplexers similar to the one shown in FIG. 8 could be provided for rearranging operand B, or alternatively each operand A, B could be passed through a single set of multiplexers sequentially with different control inputs to select different rearrangements for each operand.

Figure 9:
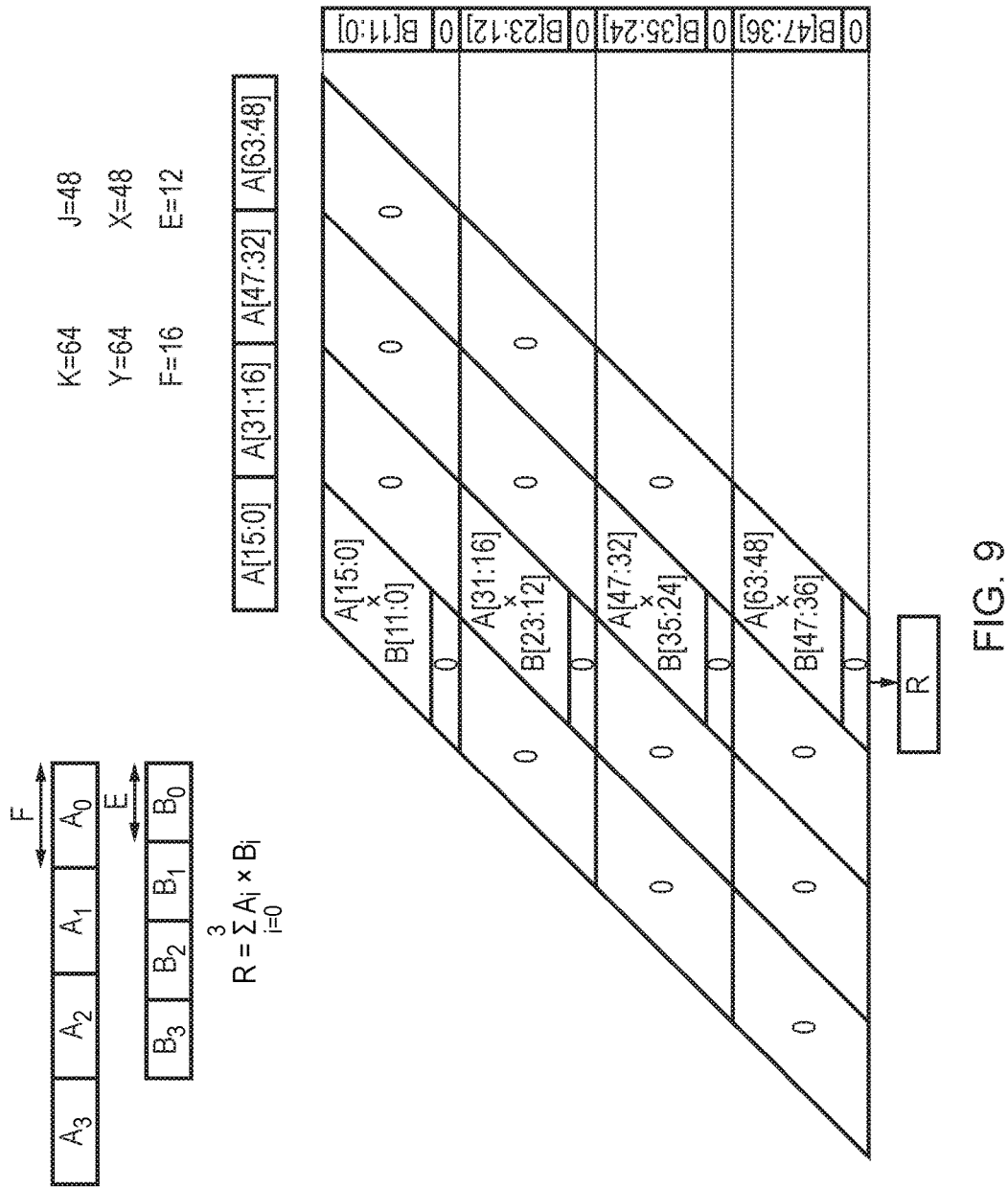
FIG. 9 shows an example of a MAP instruction where the portions multiplied to form each E×F product are of different sizes (E does not equal F)

As shown in FIG. 9, it is not essential for the input operands A, B to the MAP instruction to be of the same size, or for the element size E and F to be the same for the two operands. FIG. 9 shows an example where 16-bit portions of a 64-bit operand A are multiplied with corresponding 12-bit portions of a 48-bit operand B. The 12-bit portions are padded with 0s at the input to the multiplier array to match the width of the 16-bit portions. While the operand rearrangement is applied to the wider operand A in this example, clearly the rearrangement could also be applied to the narrower operand B.

Figure 10:
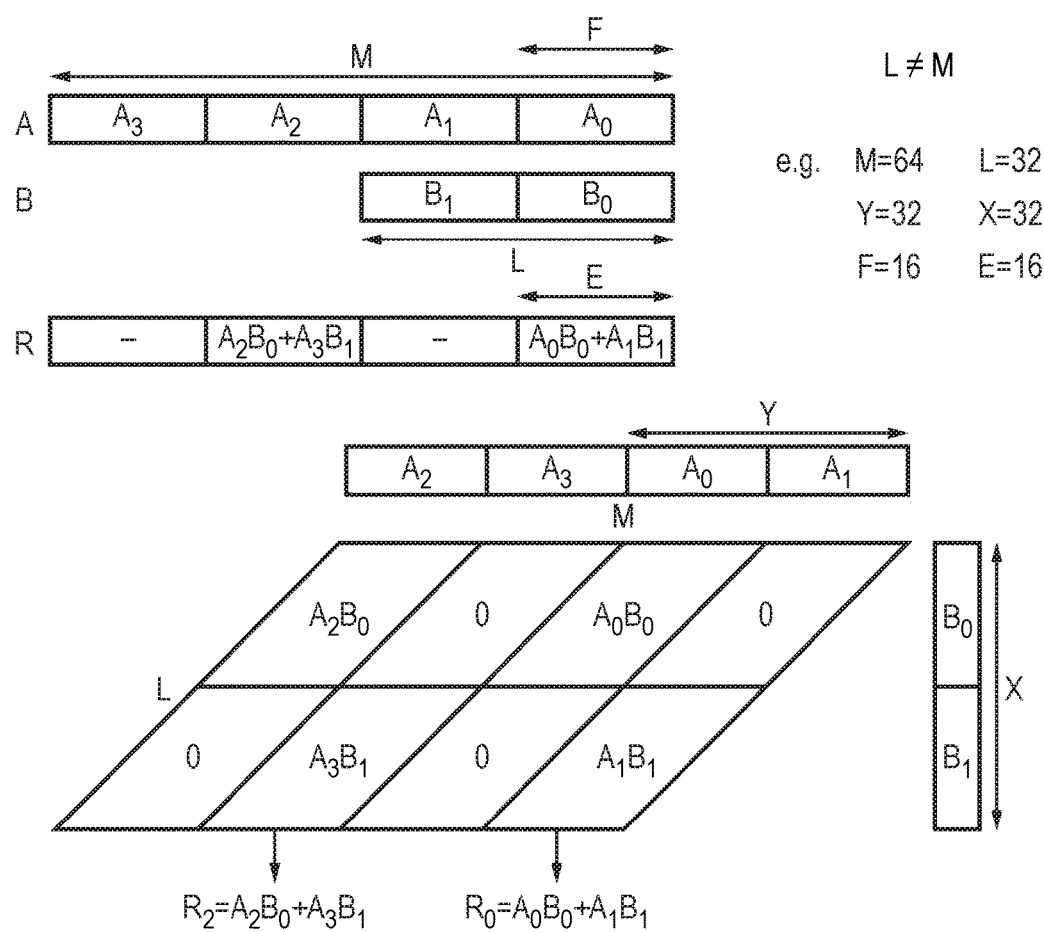
FIG. 10 shows an example of processing a MAP instruction on an L×M multiplier array where L does not equal M.

Also, as shown in FIG. 10, the technique can also be applied to an asymmetric L×M multiplier array where L does not equal M. In this example, M=2L. This example shows a case where two independent result elements are calculated, each corresponding to the same pair of E-bit portions $B_0$, $B_1$ of the first operand B but different pairs of F-bit portions $A_0$, $A_1$ or $A_2$, $A_3$ of the second operand A, with each Y-bit segment of the second operand being reversed in order independently (i.e. $A_2$ and $A_3$ are swapped and $A_0$ and $A_1$ are swapped). However, it would also be possible to calculate a single result element R by zeroing off one of the halves of the array.

An advantage of this technique is that the array of full adders that comprises the majority of both the area and the critical path of an integer multiplier is not affected by this proposal. Thus, acceleration techniques for digital multiplication (such as Wallace tree, 4:2 compression etc.) are still available. For signed multiplications, this proposal is also compatible with Booth coding which trades complexity of partial product generation for size of full adder array.

Figure 11:
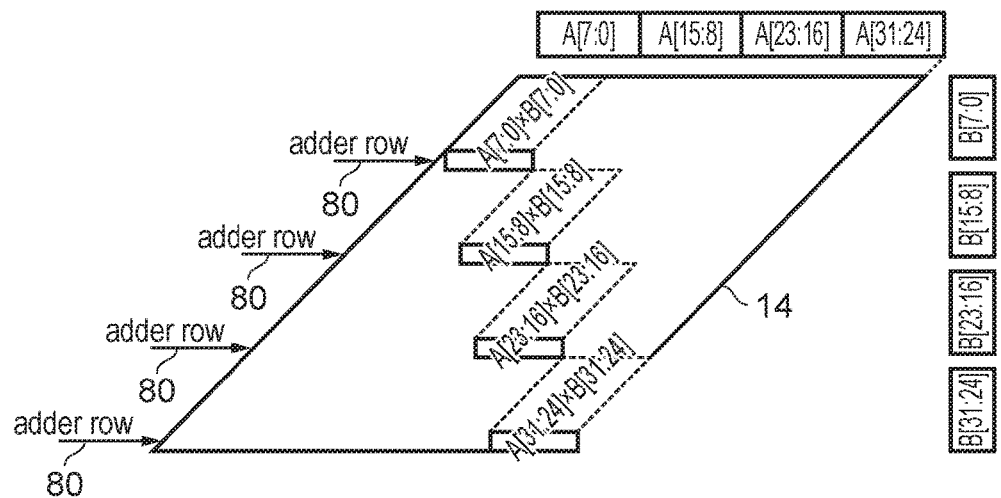
FIGS. 11 and 12 illustrate different approaches for adding additional partial products when a MAP instruction is executed using Booth encoding and unsigned arithmetic.

However, for unsigned multiplications, an extra partial product per multiplication is required. As shown in FIG. 11, this can be accommodated by expanding the array so that the number of adders is sufficient to add at least $(N+P_{max})$ Z-bit partial products, where N is one of L and M, Z is the other of L and M, P is the number of respective E×F products to be added to form one result element of the result value, and $P_{max}$ is a maximum value for P supported by the processing circuitry. In this example, the additional Pmax partial products are accommodated by including extra rows 80 of adders within the L×M multiplier array. As in this example there are a maximum of 4 E×F products to be added in response to one MAP instruction, 4 additional rows 80 of adders are included. It will be appreciated other examples may include further rows if a greater number of E×F products are to be added. For multiply instructions, these rows 80 are not required, and so the inputs to these rows may be set to zero.

Figure 12:
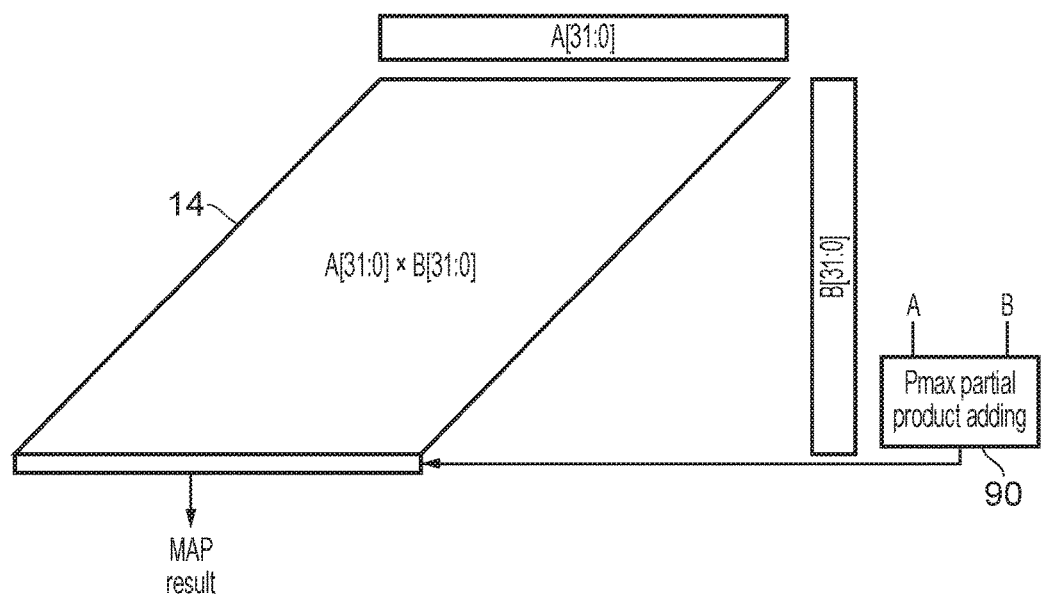

As shown in FIG. 12, an alternative which is less disruptive to the original L×M array to derive and sum the $P_{max}$ extra "unsigned-only" partial products in a separate logic circuit 90 "to one side" of the L×M multiplier array, and to add this one extra partial product into the main array instead of embedding four extra partial products into the L×M multiplier array.

A hybrid solution is also available whereby a 4-to-2 addition of the four extra unsigned-only partial products is performed in a separate logic circuit and the two extra partial products are added into the array—this arrangement trades speed (4-to-2 addition is quicker than adding four numbers) for array disruption (two extra partial products have to be accommodated in the array instead of one). In cases where $P_{max}$ is greater than 4, this could be implemented with multiple rounds of 3:2 or 4:2 addition.

Note that accumulations of the top halves of the E×F products (optionally with rounding) would not be carried out using the technique discussed above, because carries from the lower halves of the products would need to be included in the upper halves, and this can be achieved instead by a carry-propagate addition across the full width of the individual products.

Figure 13:
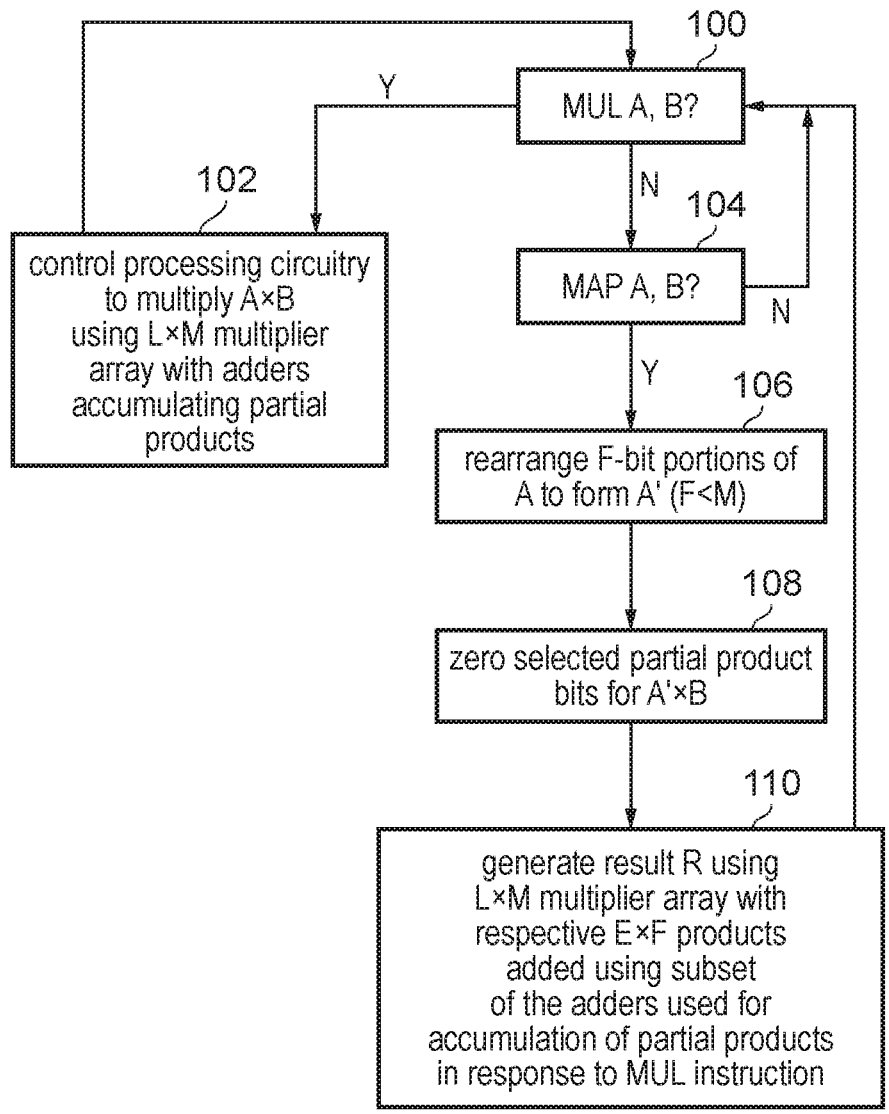
FIG. 13 shows a method of data processing supporting processing of MAP instructions using the adders of an L×M multiplier array

FIG. 13 is a flow diagram showing a method of handling multiplications using the multiplier array 14. At step 100 the instruction decoder 8 checks the next instruction to be decoded and determines the type of instruction encountered. If the instruction is a multiply instruction specifying a pair of input operands A, B to be multiplied, then at step 102 the instruction decoder 8 controls the processing circuitry 10 to supply the input operands A and B to the L×M multiplier 14 with the adders of the multiplier array accumulating the various partial products of operands A and B. In general, multiply instructions can be handled using any known technique. If the current instruction is not a multiply instruction then at step 104 the instruction decoder 8 determines whether it is a MAP instruction, and if not the instruction decoder generates control signals for controlling the processing circuitry 10 to perform another processing operation appropriate to the type of instruction being decoded.

However, if a MAP instruction is detected then at step 106 the instruction decoder 8 controls the operand rearrangement circuitry 50 of the processing circuitry 10 to rearrange the F-bit portions of input operand A to form the transformed operand A', where F<K (K is the total number of bits of the operand A). At step 108 the instructions decoder 8 controls the partial product forming circuitry 54 to zero selected partial product bits of the partial products calculated for the first J-bit operand B and the transformed K-bit operand A' so that they become zero regardless of the actual input values of A and B. Which particular partial product bits are zeroed will depend on the variant of the MAP instruction (e.g. see the zeroes shown in FIGS. 6, 7A to 7C, 9 and 10).

At step 110 the multiplier array 14 is controlled to generate the result R with respective E×F products of E-bit portions of operand B and F-bit portions of operand A added using a subset of the same adders which would be used for accumulation of partial products in response to a regular multiply instruction. This is achieved because the rearrangement of the F-bit portions at step 106 mapped the portions to be multiplied to form each E×F product into the areas of the multiplier array which are added within columns of adders so that there is no need for a subsequent adding stage.

Another instruction that may be supported by an instruction decoder in a data processing apparatus may be a shift instruction which specifies a source operand to be shifted which includes at least one data element, and also specifies at least one shift amount for shifting the at least one data element of the source operand. For scalar instructions there may only be one data element and one shift amount. For vector instructions the operand could include multiple data elements and either one shift amount can be shared between all the data elements or several different shift amounts may be specified one per element, with each data element being shifted by a number of bit positions specified by a corresponding shift amount.

In the technique discussed below, the processing circuitry includes multiplier circuitry for performing multiplications on pairs of input operands, and in response to the shift instruction, the instruction decoder controls the processing circuitry to provide to the multiplier circuitry the source operand specified by the shift instruction and a shift operand which is determined by the at least one shift amount. The multiplier circuitry processes the source operand and the shift operand as its pair of input operands and the multiplier circuitry is controlled to perform at least one multiplication which is equivalent to shifting a corresponding data element of the source operand by a number of bits specified by a corresponding shift amount, to generate a shift result value.

Figure 14:
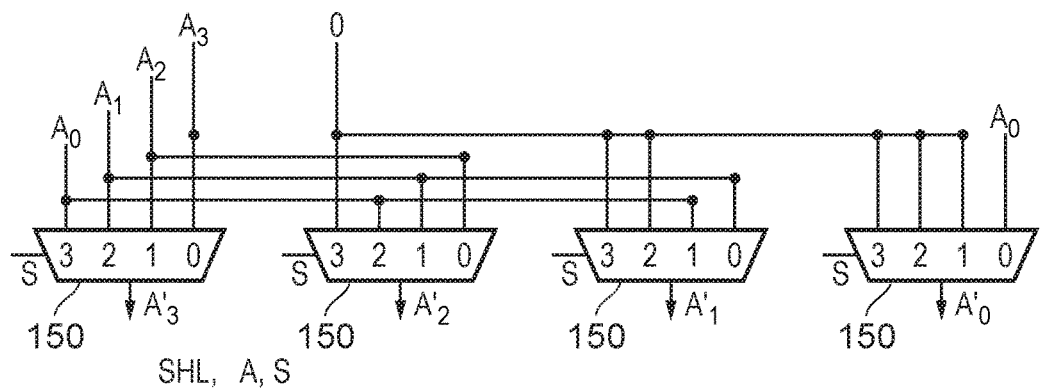
FIG. 14 shows, for comparison, an example of multiplexing circuitry for shifting a target operand left by a given number of bit positions.

Hence, shifts may be handled using the existing multiplier circuitry provided for performing multiplications. This would be counter-intuitive to a skilled person in this field. A shift left or right by a given number of bit positions may be seen as equivalent to a multiplication or division of the source operand by a certain power of 2 (left shifts mapping to positive powers of 2 and right shifts mapping to negative powers of 2). However, typically such shifts would not be carried out within the multiplier circuitry but within a separate dedicated shifting circuit. For example, FIG. 14 shows an example of such a shifting circuit which may include a set of multiplexers 150 for receiving a shift amount S specifying the number of bits by which the source operand A is to be shifted, and for selecting based on the shift amount S which bit of the input operand is mapped to each bit of the shifted result. In the example of FIG. 14 a left shift is shown, and so the lower bit positions of the shift results A' are filled with zeroes depending on the shift amount S. It will be appreciated that a similar set of multiplexers could be used to perform a right shift, but in this case then either zeroes or a sign bit may be shifted in at the upper end of the shift result.

A skilled person would normally expect dedicated shifting circuitry such as the one shown in FIG. 14 to be faster at generating a shift result than multiplier circuitry. For example the shift circuitry can be implemented with a simple set of multiplexers, but the multiplier array may require a number of partial products to be added using several rows of carry save adders as discussed with respect to FIGS. 2 and 3 above, and so the skilled person would expect this to take longer as well as consuming more dynamic power because it may require the activation of a greater number of gates. While techniques such as the use of a Wallace tree, Booth encoding, 4:2 compression etc. can be used to improve the speed of the multiplier, nevertheless because more gates are activated the skilled person would not see use of the multiplier for handling shifts as a power efficient trade off. For this reason, the trend has been for processors to go the other way and in fact use shift instructions even when the operation that is really desired is the multiplication or division by a certain power of two, but because it is expected that it would be more energy efficient to perform the desired multiplication or division on a shifter when it is known that one of the operands will be a power of two, a dedicated shift instruction is used instead.

However, at the low end processing domain where circuit area may be particularly constrained, power consumption may not be as significant a concern as conserving circuit area. Hence, by performing shifts on the multiplier circuitry, this can eliminate the need to provide dedicated shift circuitry at all in order to reduce the total circuit area. Also, in practice, for such low end processors providing dedicated shift circuitry may limit the ability to perform certain more complex forms of shift operation, such as shift operations involving saturation or rounding or certain vector shift operations. As discussed below, these types of shift operations can be relatively expensive to operate using multiplexers or other dedicated shifting circuitry as additional logic would need to be added to examine bit values within the operand being shifted or to set up the control lines required for handling different vector data element sizes for example. In practice, the multiplier circuitry within the processing circuitry may already have circuitry capable of handling variable element sizes, rounding, saturation or other variants of a basic shift operation, and so this can make it more efficient to use the multiplier circuitry to process shift instructions rather than a dedicated shifting circuit. This goes against the conventional approach which would move in the other direction of transferring multiplication operations to a shift circuit, rather than transferring shift operations to the multiplier.

The shift instruction may have a different opcode to a multiply instruction which specifies two operands to be multiplied. Unlike the multiply instruction, with the shift instruction, the second operand of the instruction is not a data value to be operated on as such, but a parameter specifying the shift amount representing the number of bit positions by which the source operand is to be shifted.

The apparatus may have a lookup table to provide a mapping between a given shift amount and a corresponding portion of the shift operand. In general the shift operand may correspond to a certain power of two which may be selected based on the shift amount specified by the shift instruction. For vector instructions, different portions of the shift operand may be set separately to correspond to different powers of two based on corresponding shift amounts.

To support vector operations, the shift instruction may specify a source operand which includes at least one data element having a current data element size selected from among a plurality of data element sizes supported by the processing circuitry. Hence, one data element could correspond to the entire source operand, or multiple data elements could be defined within the source operand, each of a smaller data element size. The current data element size may be specified as a parameter of the shift instruction or could be specified within a separate control register for example. In implementations supporting variable data element size, the shift operand could be generated based not only on the shift amount but also on the current data element size. This may be particularly useful for right shifts where the power of two to be multiplied by each portion of the source operand may correspond to the difference between the element size and the shift amount. The multiplier circuitry may include a multiplier array, and multiplier control circuitry may be provided to partition portions of the multiplier array based on the current data element size. For example the partitioning could correspond to the breaking of chains of carries between respective portions of the array. When the current data element size is smaller than the total size of the source operand, the instruction decoder may control the multiplier circuitry to perform two or more multiplications each equivalent to shifting a corresponding data element of the source operand by a number of bit positions specified by a corresponding shift amount. The shift instruction could specify a single shift amount shared between each of the data elements of the source operand, or could specify multiple different shift amounts each corresponding to one of the data elements.

For some vector implementations, a vector shift instruction may control the instruction decode to control the processing circuitry to generate a result value including multiple result data elements when the current data element size is smaller than the total size, with each result data element corresponding to a result of a respective one of the multiplications performed in response to the shift instruction. That is, each result data element may correspond to a shifted version of one of the elements of the input operand. The result data elements could be of the same size as the input data elements. Alternatively, in response to an element resizing shift instruction the instruction decoder can control the processing circuitry to generate the result value comprising data elements of a different data element size to the data elements of the source operand. For example, as each multiplication may generate a product with twice as many bits as the input, the element resizing shift instruction could generate a result value with elements twice as large as the source operand and in this case only half of the elements of the source operand may affect the result.

It is also possible to provide a reducing shift instruction for which, when the current data element size is smaller than the total size, the instruction decoder controls the processing circuitry to generate the result value comprising at least one result data element which corresponds to a sum of the results of at least two of the multiplications. That is, the reducing shift instruction can effectively shift a number of data elements of the source operand in response to the same vector instruction, but also add the shifted results together to form an accumulated result which is placed in a corresponding portion of the result data element, all in response to the same instruction. This type of reducing shift instruction can benefit from the technique discussed above where accumulations of sub products are handled within an L×M multiplier array. Hence, there may be a reordering of the source operand or the shift operand to ensure that the sub products to be added corresponding to the individual shift results are within the portions of a multiplier array that are added together within the rows of adders. If the vector instruction specifies the same shift amount for each of the lanes then there may not need to be any reordering since each of the elements of the shift operand may be identical.

The shift instruction may be a left shift or right shift instruction. Some implementations may distinguish left and right shift using different instruction opcodes, so that the left and right shift instructions may be of different types. Alternatively, the shift instruction could simply be a common type of shift instruction, but whether the shift is a left shift or a right shift may be specified by the shift amount. For example, if the shift is viewed as a rotate then a right shift by S bits can be equivalent to a left shift by N–S bit where N in the element size, so left and right shifts can in some cases be viewed as equivalent. If the shift is not a rotate operation and so rather than wrapping the bits shifted out of one end of the operands around to the other end, instead some zero bits or sign bits are injected at the lower or upper ends of the operand, then left and right shift operations become different. Even then, it is not essential to provide different instruction opcodes corresponding to the left and right shifts because this could still be identified by the shift amount. For example, the shift amount could be specified by a signed binary value specified by the shift instruction, and if the sign is positive then this may indicate one of the left and right shifts while if the sign is negative then this could indicate the other type of shift. Which of the left and right shifts is considered to map to positive or negative shift amounts may be arbitrary and depend on the particular encoding of the instruction set architecture.

For right shift operations, different forms of right shift may be provided, for example an arithmetic right shift operation may correspond to the bit values being injected at the top end of the operand being signed bits, while a logical right shift may correspond to the bit values injected at the upper end of the operand being zero. Different forms of the instruction may therefore be provided to correspond to arithmetic and logical right shifts. When the shift is implemented on the multiplier circuitry, such arithmetic and logical shifts can be handled efficiently because the multiplier circuitry may already handle both signed multiplications and unsigned multiplications and the arithmetic right shift may be mapped to the signed multiplication while the logical shift mapped to unsigned multiplication. Hence these operations can be achieved simply by controlling the multiplier circuitry to use the appropriate type of signed/unsigned multiplication.

Rounding and saturation can be difficult to handle with dedicated shift multiplexing circuits but are often already supported within a multiplier circuit. Hence, a saturated shift instruction can be provided which controls the multiplier circuitry to perform the at least one multiplication in which each multiplication is a saturating multiplication for which results of the multiplication which would fall outside a predetermined range are clamped to a minimum or maximum value of the range. While such saturation is common for multiplications, it is not for shifts. With a shift, the saturation essentially means that if the shift results in the value being greater than a maximum value or less than a minimum value, the result is clamped to the maximum or minimum value. Saturating shifts may typically be useful when performing a left shift, so this functionality need not be provided for right shifts.

Similarly, a rounding shift instruction may be provided which controls the multiplier circuitry to perform at least one multiplication with each multiplication comprising adding a rounding constant to the partial products accumulated in that multiplication. With a shift operation, the bit position at which the rounding constant is to be injected will vary based on the shift amount and it can be expensive to implement this in a multiplexing shift circuit. However, as discussed above, a multiplier array may typically already have points at which rounding values (R) can be injected into the adders 30 of the multiplier array and these can be used when performing the shift operation.

Figure 15:
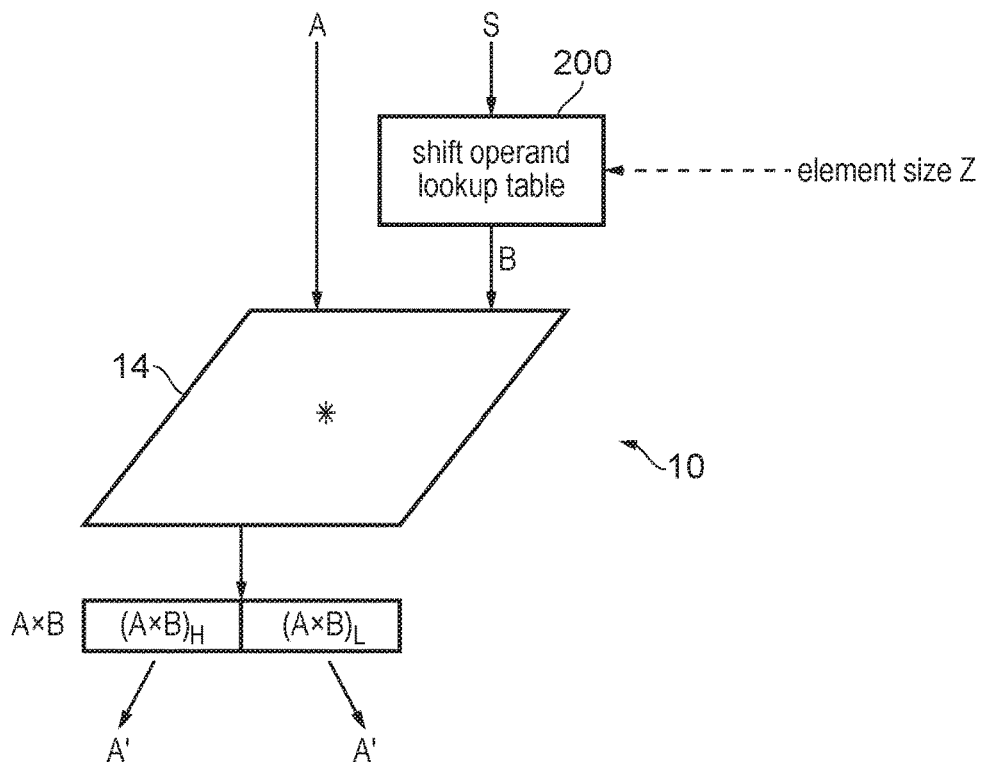
FIG. 15 shows an example of reusing the multiplier array to implement shift operations.

FIG. 15 shows an example of a portion of processing circuitry 10 for handling shift operations. A shift instruction specifies a source operand A to be shifted and a shift amount S. For vector operations a data element size Z may also be defined, either in the encoding of the instruction itself or in a separate control register. The shift amount S and element size Z are supplied to a shift operand lookup table 200 which stores a number of mappings from particular values of the shift operand S and element size Z to a shift operand B. Alternatively, rather than storing the shift operands explicitly the shift operand lookup table 200 may comprise a set of logic gates for generating the operands B based on the current element size Z and shift amount S. If this is not already indicated by the shift amount S, the shift operand lookup operation may also depend on whether a left or right shift is to be performed, and on whether the right shift is an arithmetic right shift or logical right shift.

Figure 16:
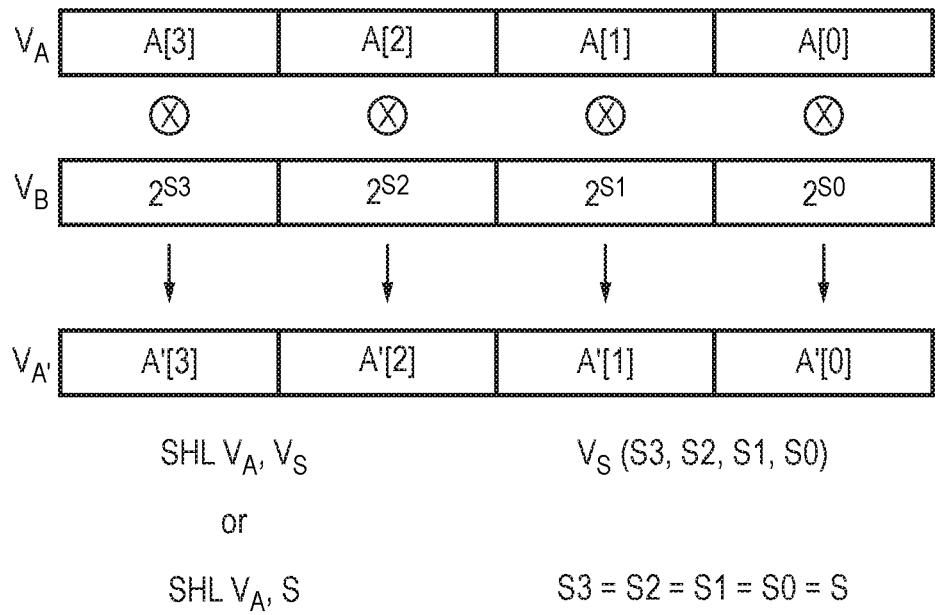
FIG. 16 shows an example of a vector shift operation in which shifts are applied to each element of a vector operand by performing an equivalent multiplication using the multiplier circuitry.

The source operand A and the generated shift operand B are then supplied as inputs to the multiplier array 14 which can be a conventional L×M multiply array of adders for adding partial products of input operands, and is the same array used for regular multiply instructions as discussed above. If the MAP instruction discussed above is supported then the array may also have the operand rearrangement circuitry or other logic associated with handling the MAP instructions as discussed above, but the reuse of the multiplier array for handling shift operations can also be used in systems which do not support such a MAP instruction. Effectively, the generation of the shift operand B corresponds to generation of a certain power of 2, which when multiplied by the source operand A shifts the relevant bits into either the upper half or the lower half of the multiplication result when calculated by the multiplier 14 and then the shifted results A' can then be read off by outputting the either lower or upper half of the product. For example, the different types of shift may be performed as follows:

based on a corresponding shift amount S0-S3 specified by the shift instruction. For example the shift instruction could specify a second vector operand $V_S$ which provides the shift amount for each vector lane. Alternatively, the shift instruction could specify a single shift amount S to be shared by all lanes and in this case each of the lanes of the shift operand vector $V_B$ would be identical. While FIG. 16 shows an example of a vector instruction applied to a left shift, it will be appreciated that right shifts can also be implemented in a similar way. With a vector processor, each vector lane could be handled using a separate instance of a multiplier array or several lanes could be handled sequentially on a common multiplier circuit to generate the respective parts of the vector result.

Figure 17:
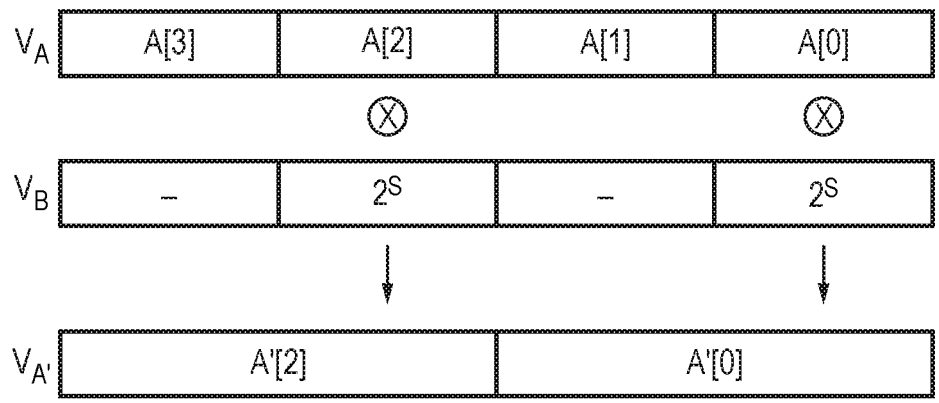
FIG. 17 shows an example of an element resizing shift instruction for generating a result value in which each element corresponds to a shifted version of a corresponding element of a target operand and the elements of the result value have a different size to the elements of the target operand.

As shown in FIG. 17 the shift instruction could also be an element resizing shift instruction which generates a result vector with different data element size to be input. For example, in FIG. 17 the result has elements which are twice as wide as the input vector A. In this case, only some of the elements of the input vector are mapped to be output and each result element corresponds to a shifted version of the

| | |
|---|---|
| Logical left shift | A is the value to shift.<br>shift (S) is the amount to shift left by.<br>size (Z) is the number of bits of the element size.<br>B is an immediate generated from the shift amount such that B = 2^shift.<br>result = (A * B) & (2^size-1)<br>The result is obtained by using the multiplier to perform an unsigned multiplication and taking the low-word result, something the multiplier is already designed to do.<br>The result can then be saturated using the saturation mechanisms already present in the multiplier. Rounding is not relevant for left shifts. |
| Arithmetic right shift | A is the value to shift.<br>shift (S) is the amount to shift right by.<br>size (Z) is the number of bits of the element size.<br>B is an immediate generated from the shift amount such that;<br>B = 2^ (size − shift).<br>result = ((A * B) >> size) & (2^size-1)<br>The result is obtained by using the multiplier to perform a signed multiplication and taking the high-word result, something the multiplier is already designed to do.<br>Rounding can be implemented by setting the appropriate rounding bits to one within the multiplication array, a mechanism that is already present in the multiplier. Saturation is not relevant for right shifts. |
| Logical right shift | This can be performed in the same way as an arithmetic right shift, but using an unsigned multiplication instead, something that is already supported by the array. |

As an alternative, for left shifts, instead of multiplying by $2^S$ and taking the low word results, the multiplier could instead multiply by $2^{Z+S}$ and then take the high word result. Ensuring that the shifting result appears in either the high or the low half of the product can be more efficient because typically the multiplier array 40 may already provide functionality for selecting the upper or lower half of a product. For example, different examples of versions of multiply instruction may be provided for returning the upper or lower halves of the product respectively, and so handling the shifted way as discussed above enables reuse of the circuitry for outputting upper/lower portions of the product for shifts as well. However, if desired then the shift result could also be mapped to an arbitrary portion of the product bits by multiplying with an appropriate power of two selected based on the shift amount S, and so it is not essential for the shift result to correspond to the lower or upper half of the product.

As shown in FIG. 16, if the shift instruction is a vector instruction then respective multiplications of each element of a target vector $V_A$ may be made with corresponding elements of the shift vector $V_B$, with each element of the shift operand $V_B$ corresponding to a power of 2 determined corresponding input element. Again, the powers of 2 used to multiply in each lane of the operation are determined based on the shift amounts and possibly based on the element size Z as well.

Figure 18:
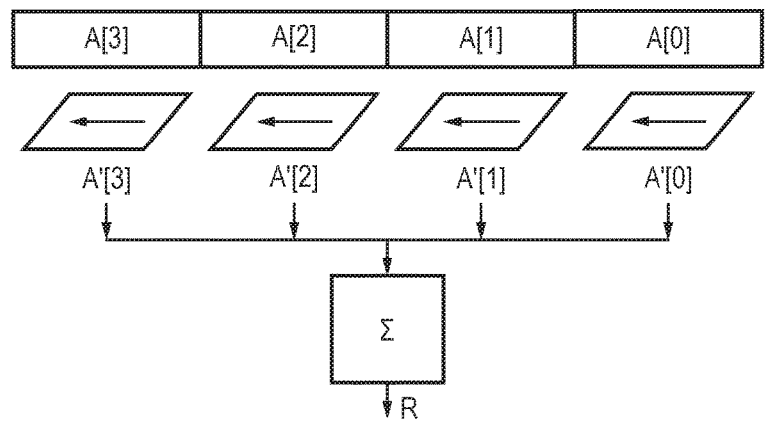
FIG. 18 shows an example of a reducing shift instruction where the results of the shift in each vector lane are added together.
Figure 19:
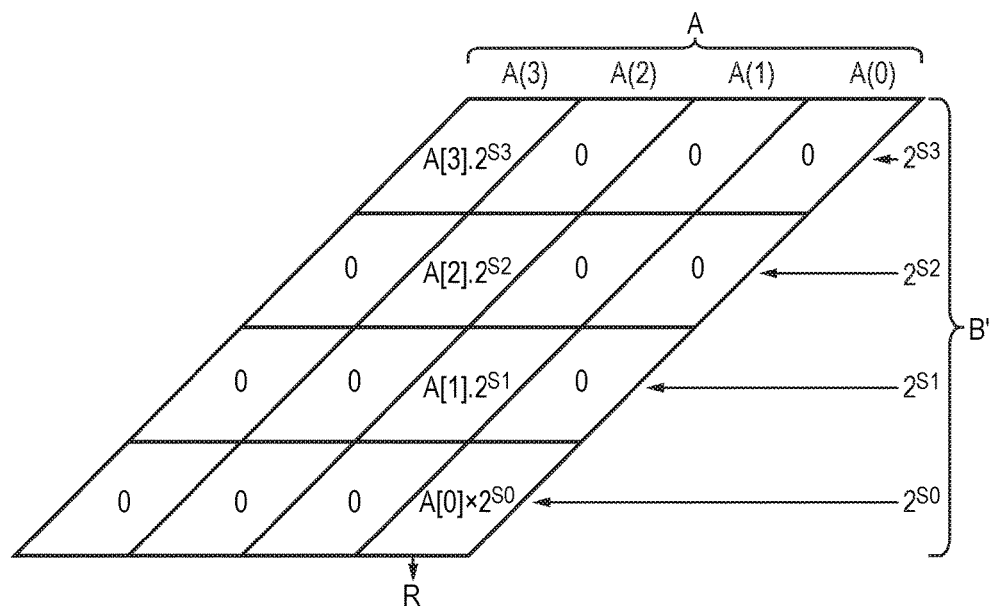
FIG. 19 shows an example of implementing the reducing shift instruction on the multiplier array so that the additions of the respective shift results are performed using existing adders for accumulating partial products in response to a multiply instruction.

As shown in FIG. 18, a reducing shift instruction may reduce the shift results of each vector lane to a single result corresponding to the sum of each of the results of the multiplications performed in response to the shift. As shown in FIG. 19, this can be done using the technique discussed above where the respective sub products are multiplied and accumulated within an L×M multiplier array by reversing the order in which the elements of one of the inputs are provided to the multiplier. In this example it is the shift operand B which is reordered, but the reordering could also be applied to the source operand A. It will be appreciated that any of the examples discussed above for accumulating products in response to a MAP instruction could also be applied to the shift instruction. Hence, while FIGS. 18 and 19 show a case where all of the sub products from each of the vector lanes are added together to form a single result, the accumulations of sub products could also be performed separately for each segment of adjacent elements within the vector and separately from other segment in a similar way to the example shown in FIG. 7B for example.

FIG. 20 shows an example of a saturating shift, in which if the shift results in a value which is greater than a maximum value then the result is clamped to the maximum value, while if the result is less than a minimum value then it is clamped to the minimum, and otherwise if it is between the minimum and maximum values then the result is the actual shift result. Saturating shifts can be particularly useful when the shift is really intended to correspond to a multiplication by a certain power of 2, and so if signed arithmetic is being used then if the shift results in non-sign bits being shifted out of the upper end of the operand, this effectively means that the result has wrapped round to become a negative value (or a negative value has wrapped round to become a positive value) and so to provide a value which more accurately represents the true result of multiplying the original shift operand A by the required power of 2, the actual shift result can be saturated to clamp it to the maximum or minimum value. With a multiplexing shift circuit similar to the one shown in FIG. 14, such saturations would be very difficult to implement efficiently especially for a low end processor where area efficiency is a significant factor, because there would need to be additional logic for examining the bits of the operand which are being shifted out and for forcing certain lower bits of the result value to 0 or 1 if saturation occurs. However, when shifts are implemented on the multiplier, often saturating multiplications may already be implemented, and so it is more efficient to reuse this circuitry to perform saturating shifts as well. For example, the carry-propagate adder 32 at the end of the multiplier array may be provided with logic for examining the more significant bits of the generated product to determine whether an overflow or underflow has occurred and hence whether the result should be saturated and clamped to the maximum or minimum value. There may typically be some multiplexers for the lower bits already provided at the output of the multiplier 14 which can inject 0s or 1s to the lower bits of the product result when a saturation is to be performed. Hence, by reusing the multiplier to handle shift instructions it is more likely that a saturating shift operation becomes feasible, increasing the flexibility of shift operations which are available.

FIG. 21 shows an example of a rounding shift operation. In this example the operand A to be shifted is right shifted by 3 bit positions which results in certain bit values shifting below the binary point position. The result could then be truncated in order to form the shift result. However, if the shift was really intended to represent a division by a certain power of 2, then often it may be desirable to round the division result to the nearest integer, and if the result is simply truncated then this may not occur. Hence, rounding can be performed where an extra bit value of 1 is added one place below the binary point position, and if the next bit below the binary point position in the original shift result is 1 this results in a carry to the bit above the binary point position to ensure that the final result represents the nearest integer to the value which would be represented if all of the bits of the intermediate result had been retained. While FIG. 21 shows an example of rounding at the binary point position, it will be appreciated that the rounding could also take place at other bit positions depending on the significance of the value being represented.

With a multiplexing shift circuit similar to the one shown in FIG. 14, it is difficult to implement such rounding because the addition of the rounding constant R may need to take place at any bit of the original input operand A, and also additional adders may need to be provided which would not normally be provided in the shifter. This would particularly be a problem for vector shifts where the support for variable data element sizes could result in complex control logic for injecting rounding bits at different locations in the shifter. Also for some rounding modes there would also need to be some logic for examining the particular bit values of the original input operand A. As discussed above in FIG. 3, the multiplier array may typically already have capability for rounding multiplication results by injecting rounding constants (R) at particular bit positions within the array, and so this functionality can be reused when performing shift operations. For example, instead of handling a rounding right shift using a dedicated shift circuit, this can instead be mapped to a multiplication of the source operand A by a power of 2 determined based on the element size and the shift amount S, and the high order portion of the product can be taken with the rounding input (R) asserted at the high order portion to effectively add 0.1 to the product.

Figure 22:
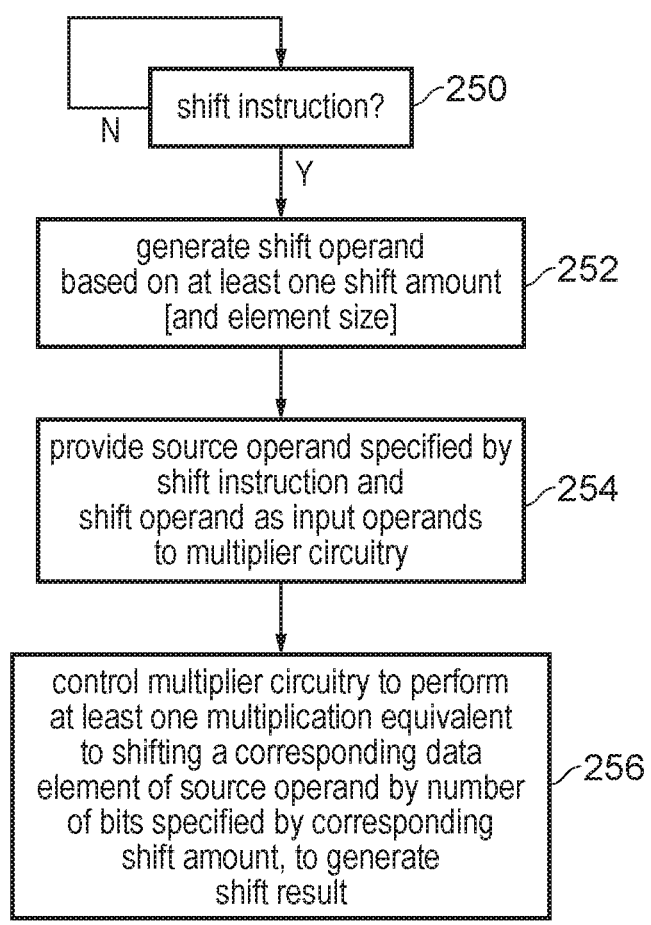
FIG. 22 shows a method of processing a shift instruction using multiply circuitry.

FIG. 22 shows a method of handling shift operations within the processing circuitry 10. At step 250 the instruction decoder 8 determines the type of the next instruction to be decoded. If the instruction is not a shift, then it is handled according to the detected type of instruction and the instruction decoder 8 generates control signals for controlling the processing circuitry 10 to perform the corresponding processing operation. If the instruction is a shift instruction then at step 252 the decoder 8 controls the shift operand forming circuitry 200 to generate a shift operand based on at least one shift amount S specified by the shift instruction, and optionally also based on the element size Z. At step 254 the shift operand and the source operand A specified by the shift instruction are provided as input operands to the multiplier circuitry 14. At step 256 the multiplier circuitry 14 multiplies the source operand A and shift operand B as if they were normal multiplication input so that the multiplier circuitry performs at least one multiplication which is equivalent to shifting a corresponding data element of the source operand A by a number of bit positions specified by a corresponding shift amount S, to generate a shift result.

This technique provides implementations with a wider range of choices regarding how to implement the rounding, saturating shifts depending on the constraints of a particular core. In area constrained cores, such as small embedded micro-controllers, this allows shifts with all the desired behaviours to be implemented with little additional hardware. Implementations can then choose to implement some or even all shifts in this manner, if this is found to be more efficient.

It is not essential to use the multiplier circuitry 14 for all types of shift instruction. While some implementations may not provide dedicated shift circuitry at all and may handle all shifts using the multiplier, other implementations may still provide a shifter for handling relatively simple types of shift, but the more complex types of shift operation, such as the rounding or saturating shifts or the shifts with accumulation of the respective shift results into a combined accumulator value, can be handled using the multiplier as discussed above.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
processing circuitry to perform data processing, the processing circuitry comprising an L×M multiplier array, where L and M are integers; and
an instruction decoder responsive to a multiply instruction specifying an L-bit operand and an M-bit operand to control the multiplier array to multiply the L-bit operand and the M-bit operand using a plurality of adders for accumulating partial products of the L-bit operand and the M-bit operand;
wherein in response to a multiply-and-accumulate-products (MAP) instruction specifying a first J-bit operand and a second K-bit operand, where J≤L and K≤M, the instruction decoder is configured to control the processing circuitry to generate a result value comprising at least one result element, each result element corresponding to a sum of respective E×F products of an E-bit portion of the first J-bit operand and an F-bit portion of the second K-bit operand, where 1<E<J and 1<F<K; and
in response to the MAP instruction, the instruction decoder is configured to control the processing circuitry to rearrange F-bit portions of the second K-bit operand to form a transformed K-bit operand, and to control the L×M multiplier array in dependence on the first J-bit operand and the transformed K-bit operand to add said respective E×F products using a subset of said plurality of adders,
wherein said subset of said plurality of adders used for adding said respective E×F products in response to the MAP instruction comprise the same adders provided in hardware that are also used for accumulating partial products of the L-bit operand and the M-bit operand in response to the multiply instruction.

2. The apparatus according to claim 1, comprising operand rearrangement circuitry to rearrange said F-bit portions of the second K-bit operand to form the transformed K-bit operand.

3. The apparatus according to claim 2, wherein for at least one segment of the second K-bit operand comprising at least two of the F-bit portions, the operand rearrangement circuitry is configured to reverse an order of the F-bit portions within that segment to form a corresponding segment of the transformed K-bit operand.

4. The apparatus according to claim 2, wherein the operand rearrangement circuitry is configured to rearrange the second K-bit operand according to one of plurality of different rearrangement patterns selected in dependence on a parameter of the MAP instruction.

5. The apparatus according to claim 1, wherein in response to the MAP instruction, the instruction decoder is configured to control the processing circuitry to rearrange E-bit portions of the first J-bit operand to form a transformed J-bit operand, and to control the L×M multiplier array in dependence on the transformed J-bit operand and the transformed K-bit operand to add said respective E×F products using the subset of said plurality of adders.

6. The apparatus according to claim 1, comprising partial product forming circuitry to generate the partial products to be accumulated by the plurality of adders of the L×M multiplier array.

7. The apparatus according to claim 6, wherein in response to the MAP instruction, the instruction decoder is configured to control the partial product forming circuitry to generate the partial products in dependence on the first J-bit operand and the transformed K-bit operand.

8. The apparatus according to claim 6, wherein in response to the MAP instruction, the instruction decoder is configured to control the partial product forming circuitry to set a subset of partial product bits of the partial products to zero irrespective of values of said first J-bit operand and said second K-bit operand.

9. The apparatus according to claim 8, wherein the instruction decoder is configured to control the partial product forming circuitry to select which partial product bits are said subset of partial product bits in dependence on a parameter of the MAP instruction.

10. The apparatus according to claim 1, wherein in response to at least one form of the MAP instruction, the instruction decoder is configured to control the processing circuitry to generate the result value comprising a plurality of result elements, each result element specifying a sum of the respective E×F products of the E-bit portions within an X-bit segment of the first J-bit operand with the F-bit portions within a Y-bit segment of the second K-bit operand, where E<X<J and F<Y<K.

11. The apparatus according to claim 10, wherein in response to said at least one form of the MAP instruction, the instruction decoder is configured to control the L×M multiplier array to add the respective E×F products for a first X-bit segment of the first J-bit operand and a first Y-bit segment of the second K-bit operand using a first subset of said plurality of adders, and to add the respective E×F products for a second X-bit segment of the first J-bit operand and a second Y-bit segment of the second K-bit operand using a second subset of said plurality of adders.

12. The apparatus according to claim 1, wherein the L×M multiplier array comprises a Wallace tree multiplier.

13. The apparatus according to claim 1, comprising Booth encoding circuitry to encode one of said first J-bit operand and said second K-bit operand using Booth encoding.

14. The apparatus according to claim 13, wherein in response to the MAP instruction, the Booth encoding circuitry is configured to encode the first J-bit operand using Booth encoding in parallel with operand rearrangement circuitry rearranging said F-bit portions of the second K-bit operand to form the transformed K-bit operand.

15. The apparatus according to claim 13, wherein said plurality of adders comprises a number of adders sufficient to add at least N Z-bit partial products, where N is one of L and M and Z is the other of L and M; and
the processing circuitry comprises additional partial product adding circuitry to add an additional $P_{max}$ partial products, where P is the number of respective E×F products to be added to form one result element of the result value, and $P_{max}$ is a maximum value for P supported by the processing circuitry;
wherein in response to said MAP instruction, the instruction decoder is configured to control the processing circuitry to generate a result corresponding to a sum of said N Z-bit partial products and at least one of said additional $P_{max}$ partial products.

16. The apparatus according to claim 15, wherein said additional partial product adding circuitry comprises further adders included in said L×M multiplier array, such that said plurality of adders comprises a number of adders sufficient to add at least $(N+P_{max})$ Z-bit partial products.

17. The apparatus according to claim 15, wherein said additional partial product adding circuitry comprises circuitry separate from said L×M multiplier array to add said additional $P_{max}$ partial products to form a single value.

18. The apparatus according to claim 15, wherein said additional partial product adding circuitry comprises:
 adding circuitry separate from said L×M multiplier array to reduce said additional $P_{max}$ partial products to R additional partial products, where $2 \leq R < P_{max}$, and
 further adders included in said L×M multiplier array, such that said plurality of adders comprises a number of adders sufficient to add at least (N+R) Z-bit partial products.

19. An apparatus comprising:
 means for performing data processing, comprising means for performing L×M multiplication; and
 an instruction decoder, responsive to a multiply instruction specifying an L-bit operand and an M-bit operand to control the means for performing L×M multiplication to multiply the L-bit operand and the M-bit operand using a plurality of means for adding to accumulate partial products of the L-bit operand and the M-bit operand;
 wherein in response to a multiply-and-accumulate-products (MAP) instruction specifying a first J-bit operand and a second K-bit operand, where $J \leq L$ and $K \leq M$, the instruction decoder is configured to control the means for performing data processing to generate a result value comprising at least one result element, each result element corresponding to a sum of respective E×F products of an E-bit portion of the first J-bit operand and an F-bit portion of the second K-bit operand, where $1 < E < J$ and $1 < F < K$; and
 in response to the MAP instruction, the instruction decoder is configured to control the means for performing data processing to rearrange F-bit portions of the second K-bit operand to form a transformed K-bit operand, and to control the means for performing L×M multiplication in dependence on the first J-bit operand and the transformed K-bit operand to add said respective E×F products using a subset of said plurality of means for adding,
 wherein said subset of said means for adding used for adding said respective E×F products in response to the MAP instruction comprise the same means for adding provided in hardware that are also used for accumulating partial products of the L-bit operand and the M-bit operand in response to the multiply instruction.

20. A data processing method for an apparatus comprising an L×M multiplier array comprising a plurality of adders for accumulating partial products of an L-bit operand and an M-bit operand to be multiplied in response to a multiply instruction, where L and M are integers,
 the method comprising:
 in response to a multiply-and-accumulate-products (MAP) instruction specifying a first J-bit operand and a second K-bit operand, where $J \leq L$ and $K \leq M$:
 rearranging F-bit portions of the second K-bit operand to form a transformed K-bit operand, where $1 < F < K$; and
 controlling the L×M multiplier array in dependence on the first J-bit operand and the transformed K-bit operand, to generate a result value comprising at least one result element, each result element corresponding to a sum of respective E×F products of an E-bit portion of the first J-bit operand and an F-bit portion of the second K-bit operand, where $1 < E < J$;
 wherein the respective E×F products are added using a subset of said plurality of adders, wherein said subset of said plurality of adders used for adding said respective E×F products in response to the MAP instruction comprise the same adders provided in hardware that are also used for accumulating partial products of the L-bit operand and the M-bit operand in response to the multiply instruction.

* * * * *